United States Patent
Lee et al.

(10) Patent No.: US 11,532,289 B2
(45) Date of Patent: Dec. 20, 2022

(54) IMAGE DISPLAY APPARATUS

(71) Applicant: LG ELECTRONICS INC., Seoul (KR)

(72) Inventors: Jonghyung Lee, Seoul (KR); Kangsoo Kim, Seoul (KR); Hyomin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/277,225

(22) PCT Filed: Sep. 18, 2019

(86) PCT No.: PCT/KR2019/012062
§ 371 (c)(1),
(2) Date: Mar. 17, 2021

(87) PCT Pub. No.: WO2020/060186
PCT Pub. Date: Mar. 26, 2020

(65) Prior Publication Data
US 2022/0028353 A1 Jan. 27, 2022

(30) Foreign Application Priority Data
Sep. 18, 2018 (KR) .......................... 10-2018-0111807

(51) Int. Cl.
*H04N 21/485* (2011.01)
*G09G 5/10* (2006.01)
*G09G 3/3233* (2016.01)

(52) U.S. Cl.
CPC ............. *G09G 5/10* (2013.01); *G09G 3/3233* (2013.01); *H04N 21/4854* (2013.01); *G09G 2320/0646* (2013.01); *G09G 2360/16* (2013.01)

(58) Field of Classification Search
CPC ................... G09G 5/10; G09G 3/3233; G09G 2320/0646; G09G 2360/16;
(Continued)

(56) References Cited

U.S. PATENT DOCUMENTS 10,580,367 B2 * 3/2020 Vernon .................. H04N 19/98
11,100,888 B2 * 8/2021 Nasiopoulos ........ H04N 19/117
(Continued)

FOREIGN PATENT DOCUMENTS

KR  10-2006-0086294  7/2006
KR  10-2007-0025871  3/2007
(Continued)

OTHER PUBLICATIONS

PCT International Application No. PCT/KR2019/012062, International Search Report dated Jan. 21, 2020, 3 pages.
(Continued)

*Primary Examiner* — Antonio Xavier
(74) *Attorney, Agent, or Firm* — Lee Hong Degerman Kang & Waimey

(57) ABSTRACT

The present disclosure relates to an image display apparatus. The image display apparatus includes: a display; and a controller configured to control the display, wherein the controller detects a first peak area corresponding to a luminance value greater than or equal to a first reference value, and a second peak area corresponding to a luminance value between the first reference value and a second reference value less than the first reference value, in response to the number of pixels in the second peak area being less than or equal to a predetermined number, the controller performs first tone mapping based on the first peak area, the controller performs second tone mapping based on the first peak are and the second peak area, wherein a luminance value of the second peak area during the second tone mapping is greater
(Continued)

than a luminance value of the second peak area during the first tone mapping. Accordingly, luminance and contrast during displaying image may be improved.

20 Claims, 32 Drawing Sheets

(58) Field of Classification Search
CPC ..... G09G 2320/046; G09G 2320/0673; G09G 2320/0686; H04N 21/4854; H04N 21/4318; H04N 21/44008; H04N 5/57; H04N 21/42204
See application file for complete search history.

(56) References Cited

U.S. PATENT DOCUMENTS

| | | | |
|---|---|---|---|
| 2006/0066756 A1 | 3/2006 | Yamagishi et al. | |
| 2009/0256935 A1 | 10/2009 | Endo et al. | |
| 2014/0300819 A1* | 10/2014 | Fujine | G09G 3/34 348/687 |
| 2016/0104438 A1* | 4/2016 | Han | G06T 5/008 345/690 |
| 2016/0267318 A1 | 9/2016 | Sakai | |
| 2016/0360174 A1* | 12/2016 | Tao | H04N 5/265 |
| 2018/0139429 A1* | 5/2018 | Park | H04N 19/186 |
| 2018/0204542 A1* | 7/2018 | Saito | G09G 5/14 |
| 2018/0218481 A1 | 8/2018 | Evans et al. | |
| 2019/0052908 A1* | 2/2019 | Mertens | H04N 19/102 |
| 2019/0295504 A1* | 9/2019 | Xiong | G09G 5/10 |
| 2019/0335149 A1* | 10/2019 | Hirota | H04N 5/20 |

FOREIGN PATENT DOCUMENTS

| | | |
|---|---|---|
| KR | 10-2007-0120795 | 12/2007 |
| KR | 10-2015-0124832 | 11/2015 |
| WO | 2017-051612 | 3/2017 |

OTHER PUBLICATIONS

European Patent Office Application Serial No. 19863299.4, Search Report dated May 31, 2022, 9 pages.

* cited by examiner (a)          (b)          (c)

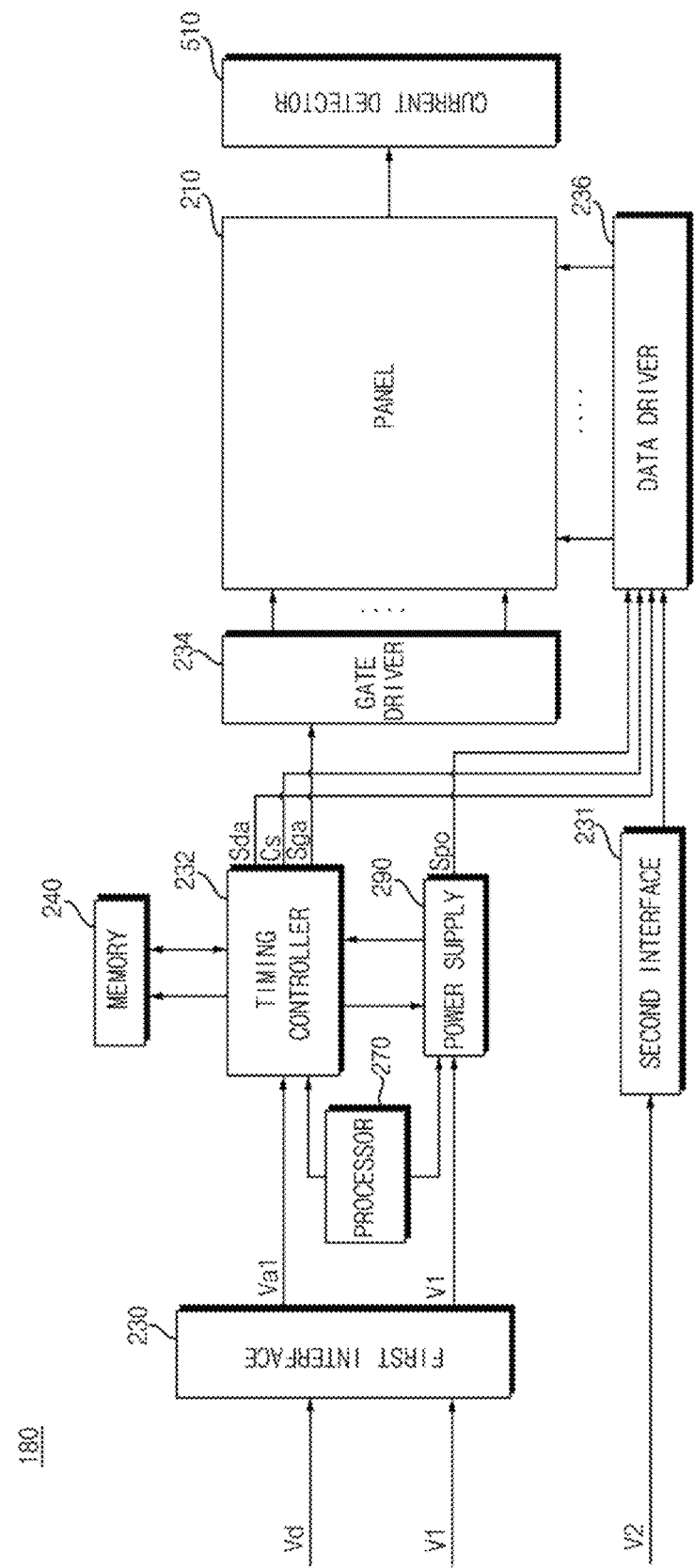

IMAGE DISPLAY APPARATUS

CROSS-REFERENCE TO RELATED APPLICATIONS

This application is the National Stage filing under 35 U.S.C. 371 of International Application No. PCT/KR2019/012062, filed on Sep. 18, 2019, which claims the benefit of earlier filing date and right of priority to Korean Application No. 10-2018-0111807, filed on Sep. 18, 2018, the contents of which are all hereby incorporated by reference herein their entirety.

BACKGROUND OF THE DISCLOSURE

1. Field of the Disclosure

The present disclosure relates to an image display apparatus, and more particularly to an image display apparatus capable of improving luminance and contrast during displaying image.

2. Description of the Related Art

An image display apparatus is an apparatus for providing an image that a user can watch. The user can watch various images through the image display apparatus.

Recently, a high dynamic range (HDR) method is used for displaying images captured by a camera or external input images with enhanced luminance.

In the method, luminance representation of images may be improved, such that research is conducted on various methods to enhance luminance representation.

SUMMARY

It is an object of the present disclosure to provide an image display apparatus capable of improving luminance and contrast during displaying image.

In accordance with an aspect of the present disclosure, the above and other objects can be accomplished by providing an image display apparatus, including: a display; and a controller configured to control the display, wherein the controller detects a first peak area corresponding to a luminance value greater than or equal to a first reference value among luminance values of an input image, and a second peak area corresponding to a luminance value between the first reference value and a second reference value less than the first reference value among the luminance values of the input image, in response to the number of pixels in the second peak area being less than or equal to a predetermined number, the controller performs first tone mapping based on the first peak area, and in response to the number of pixels in the second peak area exceeding the predetermined number, the controller performs second tone mapping based on the first peak area and the second peak area, wherein a luminance value of the second peak area during the second tone mapping is greater than a luminance value of the second peak area during the first tone mapping.

Meanwhile, the controller may control a luminance variation of the second peak area to be greater than a luminance variation of the first peak area.

Meanwhile, in response to a difference in peak luminance of the input image being less a third reference value, the controller may detect a corresponding area as the second peak area.

Meanwhile, the controller may calculate an Average Picture Level (APL) in units of frames or scenes, and may control a luminance increment of the second peak image to be changed according to the APL.

Meanwhile, as the APL increases, the controller may decrease a luminance increment of the second peak image.

Meanwhile, based on a setting input, the controller may change a level of the second reference value.

Meanwhile, as the level of the second reference value decreases, the controller may increase a size of the second peak area, and may increase luminance of the second peak area having the increased size.

Meanwhile, based on a setting input, the controller may change the level of the first reference value.

Meanwhile, as the level of the first reference value decreases, the controller may increase a size of the first peak area, and may control luminance of the first peak area corresponding to the increased size, to be converted into the first luminance level.

Meanwhile, when the size of the pattern is greater than or equal to the reference size in a state in which images having a gradually decreasing pattern are sequentially received, the controller may increase luminance of the pattern, and in response to the size of the pattern being less than the reference size, the controller may control luminance of the pattern to be maintained at a predetermined level or to remain as it is.

Meanwhile, in response to an input of an image quality setting, the controller may control displaying of an image quality setting menu for setting an image quality, and in response to a dynamic tone mapping item being selected from the image quality setting menu, the controller may control displaying of the dynamic tone mapping screen for changing luminance.

Meanwhile, the controller may receive a pointing signal from a remote controller, and may control displaying of a pointer corresponding to the pointing signal on the dynamic tone mapping screen.

Meanwhile, the dynamic tone mapping screen may include a first reference value item for changing the first reference value, and a second reference value item for changing the second reference value, wherein based on movement of the pointer, the controller may change a setting of the first reference value item or the second reference value item.

Meanwhile, among the luminance values of the input image, the controller may control luminance of an area corresponding to a luminance value less than or equal to the second reference value to be changed by nonlinear scaling.

Meanwhile, during luminance conversion, the controller may convert luminance of the first peak area into a first luminance level, may increase luminance of the second peak area, and may control an image, on which the luminance conversion is performed, to be displayed on the display.

Meanwhile, the controller may control the first reference value to be changed based on a peak luminance of the input image.

Meanwhile, a difference between the second reference value and the first reference value may be preferably within a predetermined range.

Meanwhile, the first reference value may preferably correspond to peak luminance of the input image.

Meanwhile, in accordance with another aspect of the present disclosure, the above and other objects can be accomplished by providing an image display apparatus, including: a display; and a controller configured to control the display, wherein when a size of the pattern is greater than or equal to a reference size in a state in which an image having a gradually decreasing pattern are sequentially received, the controller may increase luminance of the pattern, and in response to the size of the pattern being less than the reference size, the controller may control luminance of the pattern to be maintained at a predetermined level, or to remain as it is.

Meanwhile, in response to a difference in peak luminance of the pattern being less than a reference value, and in response to the size of the pattern being greater than or equal to the reference size, the controller may increase luminance of the pattern.

Meanwhile, in response to a difference in peak luminance of the pattern exceeding the reference value, and in response to the size of the pattern being less than the reference size, the controller may control luminance of the pattern to be maintained at a predetermined level or to remain as it is.

BRIEF DESCRIPTION OF THE DRAWINGS

FIG. 5 is an internal block diagram of a display of FIG. 2;

DETAILED DESCRIPTION OF THE PREFERRED EMBODIMENTS

Hereinafter, embodiments of the present disclosure will be described in further detail with reference to the accompanying drawings.

In the present disclosure, the terms "module" and "unit", which are used herein to signify components, are merely intended to facilitate explanation of the present disclosure, and the terms do not have any distinguishable difference in meaning or role. Thus, the terms "module" and "unit" may be used interchangeably.

Figure 1:
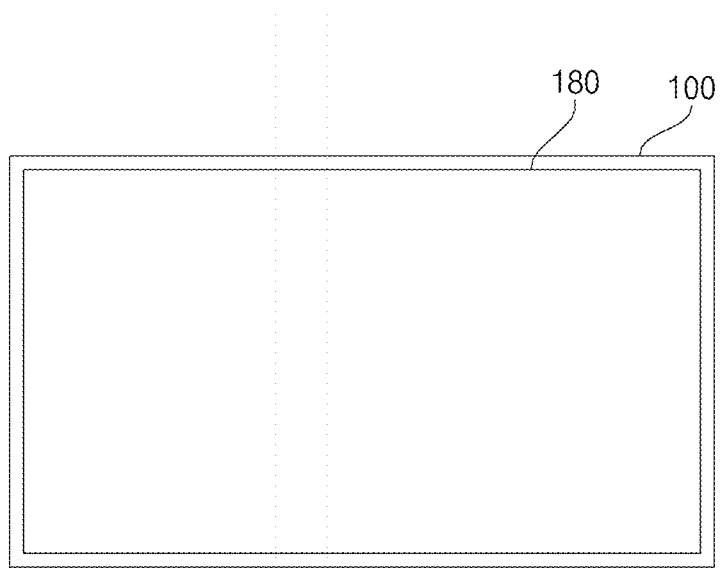
FIG. 1 is a diagram showing an image display apparatus according to an embodiment of the present disclosure.

FIG. 1 is a diagram showing an image display apparatus according to an embodiment of the present disclosure.

Referring to the drawing, an image display apparatus 100 according to an embodiment of the present disclosure may include a display 180.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel), and the like.

According to an embodiment of the present disclosure, the image display apparatus includes: the display 180; and a controller 170 configured to control the display 180, wherein the controller detects a first peak area corresponding to a luminance value greater than or equal to a first reference value among luminance values of an input image, and a second peak area corresponding to a luminance value between the first reference value and a second reference value less than the first reference value among the luminance values of the input image. During luminance conversion, the controller converts luminance of the first peak area into a first luminance level, increases luminance of the second peak area, and controls an image, on which the luminance conversion is performed, to be displayed on the display 180. Accordingly, luminance and contrast during displaying image may be improved.

Particularly, compared to the first peak area in which luminance is saturated, luminance of the second peak area is increased such that luminance and contrast during displaying image may be improved.

Meanwhile, the controller 170 may control a luminance variation of the second peak area to be greater than a luminance variation of the first peak area. Accordingly, luminance and contrast of the second peak area during displaying image may be improved.

Meanwhile, in response to a difference in peak luminance of the input image being less a third reference value, the controller 170 may detect a corresponding area as the second peak area. Accordingly, the second peak area may easily be detected.

Various operating methods of the aforementioned image display apparatus 100 will be described in further detail later with reference to FIG. 7 and the following figures.

Meanwhile, the image display apparatus 100 of FIG. 1 may be a TV, a monitor, a tablet PC, a mobile terminal, a vehicle display, and the like.

Figure 2:
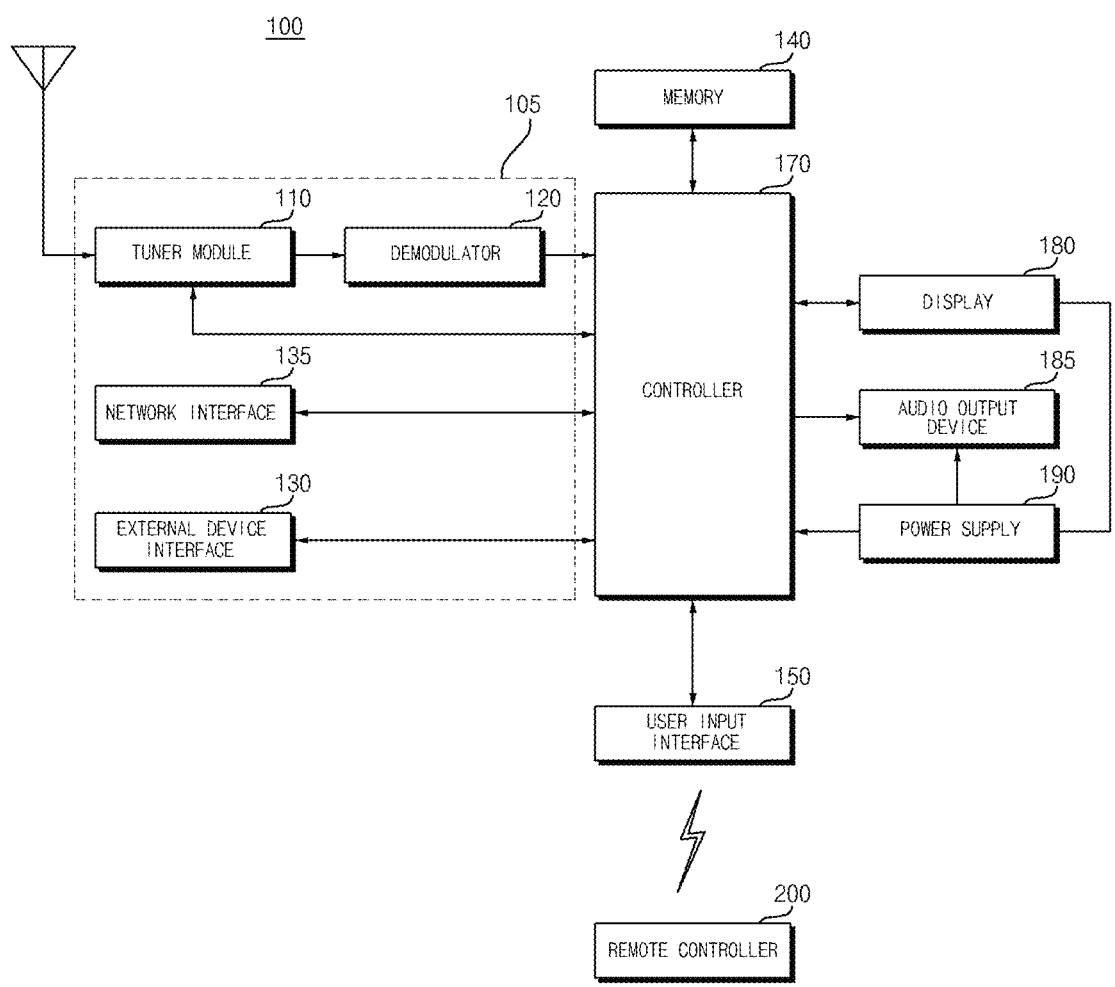
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes a broadcast receiver 105, an external device interface 130, a memory 140, a user input interface 150, a sensor device (not shown), a controller 170, a display 180, and an audio output device 185.

The broadcast receiver 105 may include a tuner module 110, a demodulator 120, a network interface 135, and an external device interface 130.

Meanwhile, unlike the drawing, the broadcast receiver 105 may include only the tuner module 110, the demodulator 120, and the external device interface 130. That is, the network interface 135 may not be included.

The tuner module 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or an audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner module 110 may process a digital broadcast signal or an analog broadcast signal. The analog baseband image or audio signal (CVBS/SIF) output from the tuner module 110 may be directly input to the controller 170.

Meanwhile, the tuner module 110 may include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner module 110 and performs a demodulation operation.

The demodulator 120 may perform demodulation and channel decoding and then output a stream signal TS. At this time, the stream signal may be a multiplexed signal of an image signal, an audio signal, or a data signal.

The stream signal output from the demodulator 120 may be input to the controller 170. The controller 170 performs demultiplexing, image/audio signal processing, and the like, and then outputs an image to the display 180 and outputs audio to the audio output device 185.

The external device interface 130 may transmit or receive data with a connected external apparatus (not shown), e.g., a set-top box 50. To this end, the external device interface 130 may include an A/V input and output device (not shown).

The external device interface 130 may be connected in wired or wirelessly to an external apparatus such as a digital versatile disk (DVD), a Blu ray, a game equipment, a camera, a camcorder, a computer (note book), and a set-top box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external device interface 130 may exchange data with an adjacent mobile terminal 600. In particular, in a mirroring mode, the external device interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the controller 170, and may store signal-processed image, audio, or data signal.

In addition, the memory 140 may serve to temporarily store image, audio, or data signal input to the external device interface 130. In addition, the memory 140 may store information on a certain broadcast channel through a channel memory function such as a channel map.

Although FIG. 2 illustrates that the memory is provided separately from the controller 170, the scope of the present disclosure is not limited thereto. The memory 140 may be included in the controller 170.

The user input interface 150 transmits a signal input by the user to the controller 170 or transmits a signal from the controller 170 to the user.

For example, the user input interface 150 may transmit/receive a user input signal such as power on/off, channel selection, screen setting, etc., from a remote controller 200, may transfer a user input signal input from a local key (not shown) such as a power key, a channel key, a volume key, a set value, etc., to the controller 170, may transfer a user input signal input from a sensor device (not shown) that senses a user's gesture to the controller 170, or may transmit a signal from the controller 170 to the sensor device (not shown).

The controller 170 may demultiplex the input stream through the tuner module 110, the demodulator 120, the network interface 135, or the external device interface 130, or process the demultiplexed signals to generate and output a signal for image or audio output.

The image signal processed by the controller 170 is input to the display 180, and may be displayed as an image corresponding to the image signal. In addition, the image signal processed by the controller 170 may be input to the external output apparatus through the external device interface 130.

The audio signal processed by the controller 170 may be output to the audio output device 185 as an audio signal. In addition, the audio signal processed by the controller 170 may be input to the external output apparatus through the external device interface 130.

Although not illustrated in FIG. 2, the controller 170 may include a demultiplexer, an image processor, and the like, which will be described later with reference to FIG. 3.

In addition, the controller 170 may control the overall operation of the image display apparatus 100. For example, the controller 170 may control the tuner module 110 to control the tuning of the RF broadcast corresponding to the channel selected by the user or the previously stored channel.

In addition, the controller 170 may control the image display apparatus 100 according to a user command input through the user input interface 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the controller 170 may recognize the position of the user based on the image photographed by a photographing device (not shown). For example, the distance (z-axis coordinate) between a user and the image display apparatus 100 may be determined. In addition, the x-axis coordinate and the y-axis coordinate in the display 180 corresponding to a user position may be determined.

The display 180 generates a driving signal by converting an image signal, a data signal, an OSD signal, a control signal processed by the controller 170, an image signal, a data signal, a control signal, and the like received from the external device interface 130.

Meanwhile, the display 180 may be configured as a touch screen and used as an input device in addition to an output device.

The audio output device 185 receives a signal processed by the controller 170 and outputs it as an audio.

The photographing device (not shown) photographs a user. The photographing device (not shown) may be implemented by a single camera, but the present disclosure is not limited thereto and may be implemented by a plurality of cameras. Image information photographed by the photographing device (not shown) may be input to the controller 170.

The controller 170 may sense a gesture of the user based on each of the images photographed by the photographing device (not shown), the signals detected from the sensor device (not shown), or a combination thereof.

The power supply 190 supplies corresponding power throughout the image display apparatus 100. Particularly, the power supply 190 may supply power to the controller 170 which may be implemented in the form of a system on chip (SOC), a display 180 for displaying an image, and an audio output device 185 for audio output.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
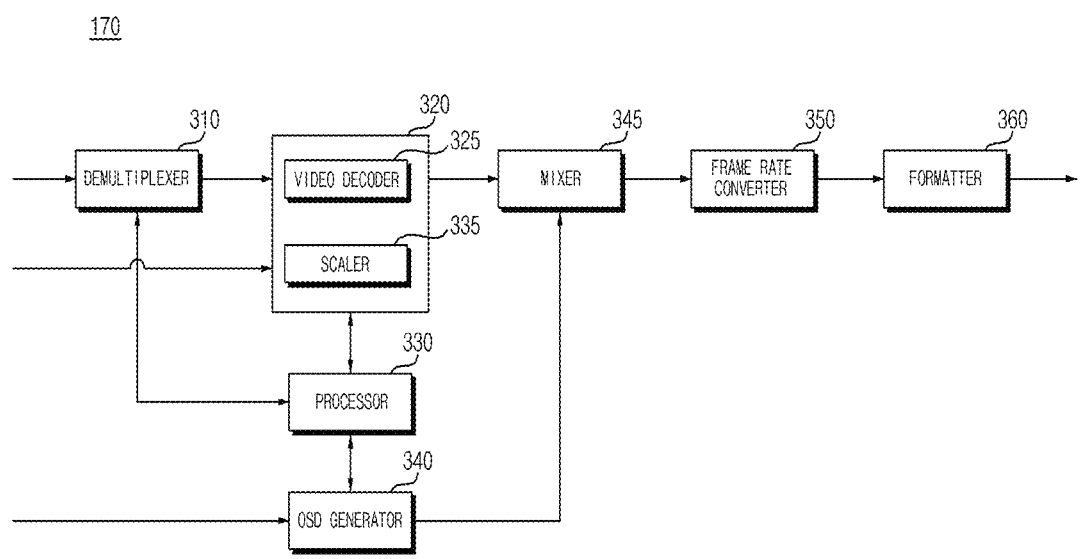
FIG. 3 is an example of an internal block diagram of the controller in FIG. 2.

FIG. 3 is an example of an internal block diagram of the controller in FIG. 2.

Referring to the drawing, the controller 170 according to an embodiment of the present disclosure may include a demultiplexer 310, a video processor 320, a processor 330, an OSD processor 340, a mixer 345, a frame rate converter 350, and a formatter 360. In addition, the processor 170 may further include an audio processor (not shown) and a data processor (not shown).

The demultiplexer 310 demultiplexes the input stream. For example, when an MPEG-2 TS is input, it may be demultiplexed into image, audio, and data signal, respectively. Here, the stream signal input to the demultiplexer 310 may be a stream signal output from the tuner module 110, the demodulator 120, or the external device interface 130.

The video processor 320 may perform image processing on a demultiplexed image signal. To this end, the video processor 320 may include a video decoder 325 and a scaler 335.

The video decoder 325 decodes a demultiplexed image signal, and the scaler 335 performs scaling so that the resolution of the decoded image signal may be output from the display 180.

The video decoder 325 may include a decoder of various standards. For example, a 3D video decoder for MPEG-2, H.264 decoder, a color image, and a depth image, and a decoder for a multiple view image may be provided.

The processor 330 may control the overall operation of the image display apparatus 100 or the controller 170. For example, the processor 330 may control the tuner 110 to tune in to an RF broadcast corresponding to a channel selected by a user or a prestored channel.

In addition, the processor 330 may control the image display apparatus 100 according to a user command input through the user input interface 150 or an internal program.

Further, the processor 330 may control data transmission with the network interface 135 or the external device interface 130.

In addition, the processor 330 may control operations of the demultiplexer 310, the image processor 320, the OSD processor 340, and the like in the controller 170.

The OSD processor 340 generates an OSD signal according to a user input or by itself. For example, based on a user input signal, the OSD processor 340 may generate a signal for displaying various pieces of information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that may be displayed on the display, based on a pointing signal input from the remote controller 200. In particular, such pointer may be generated by a pointing signal processor, and the OSD processor 240 may include a pointing signal processor (not shown) for processing such pointing signal. Obviously, the pointing signal processor (not shown) may be provided separately from the OSD processor 240, without being provided therein.

The mixer 345 may mix the OSD signal generated by the OSD processor 340 with the decoded video signal processed by the video processor 320. The mixed signal is provided to the frame rate converter 350.

The frame rate converter 350 may convert a frame rate of the input image. The frame rate converter 350 may output the image without separate frame rate conversion.

Meanwhile, the formatter 360 may change a format of an input image signal into a format suitable for displaying the image signal on a display and output the image signal in the changed format.

The formatter 360 may change the format of the image signal. For example, the formatter 360 may change the format of the 3D image signal into any one of various 3D formats such as a side by side format, a top/down format, a frame sequential format, an interlaced format, a checker box format, and the like.

Meanwhile, the audio processor (not shown) in the controller 170 may perform the audio processing of the demultiplexed audio signal. To this end, the audio processor (not shown) may include various decoders.

In addition, the audio processor (not shown) in the controller 170 may process a base, a treble, a volume control, and the like.

The data processor (not shown) in the controller 170 may perform data processing of the demultiplexed data signal. For example, when the demultiplexed data signal is a coded data signal, it may be decoded. The encoded data signal may be electronic program guide information including broadcast information such as a start time and an end time of a broadcast program broadcasted on each channel.

Meanwhile, a block diagram of the controller 170 shown in FIG. 3 is a block diagram for an embodiment of the present disclosure. Each component of the block diagram may be integrated, added, or omitted according to a specification of the controller 170 actually implemented.

Particularly, the frame rate converter 350 and the formatter 360 may be provided separately without being provided in the controller 170, or may be provided separately as one module.

Figure 4A:
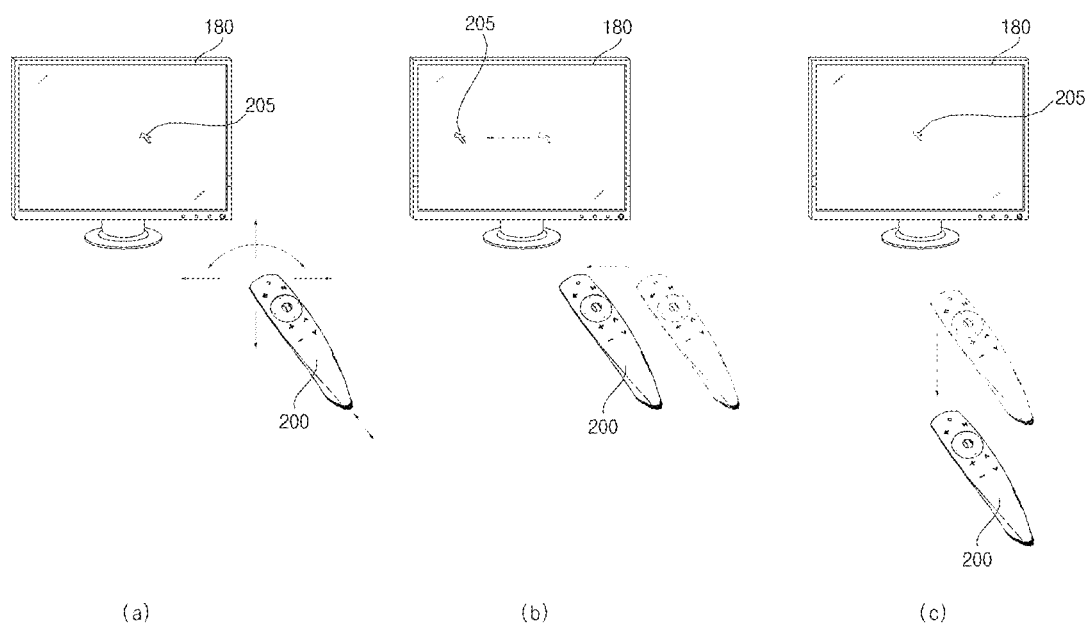
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed according to the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it may be displayed to be enlarged. On the other hand, when the user moves the remote controller 200 close to the display 180, the selection area within the display 180 corresponding to the pointer 205 may be zoomed out so that it may be displayed to decrease. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
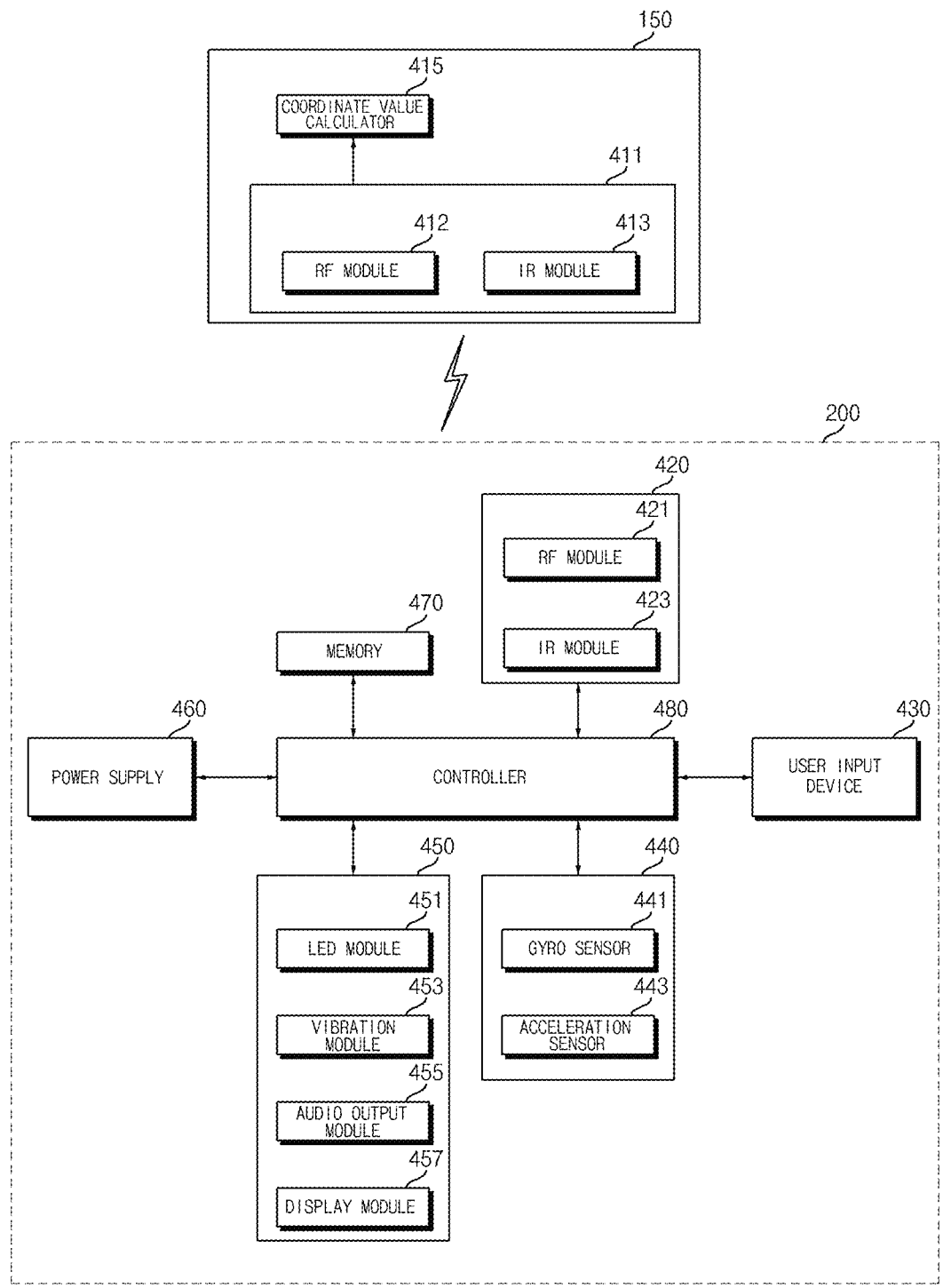
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input device 430, a sensor device 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In this embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to an IR communication standard.

In this embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 430 may be implemented by a keypad, a button, a touch pad, a touch screen, or the like. The user may operate the user input device 430 to input a command related to the image display apparatus 100 to the remote controller 200. When the user input device 430 includes a hard key button, the user may input a command related to the image display apparatus 100 to the remote controller 200 through a push operation of the hard key button. When the user input device 430 includes a touch screen, the user may touch a soft key of the touch screen to input the command related to the image display apparatus 100 to the remote controller 200. In addition, the user input device 430 may include various types of input means such as a scroll key, a jog key, etc., which may be operated by the user, and the present disclosure does not limit the scope of the present disclosure.

The sensor device 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 430 or a signal transmitted from the image display apparatus 100. Through the output device 450, the user may recognize whether the user input device 430 is operated or whether the image display apparatus 100 is controlled.

For example, the output device 450 may include an LED module 451 that is turned on when the user input device 430 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 430 or a signal corresponding to the motion of the remote controller 200 sensed by the sensor device 440 to the image display apparatus 100 through the wireless communicator 425.

The user input interface 150 of the image display apparatus 100 includes a wireless communicator 151 that may wirelessly transmit and receive a signal to and from the remote controller 200 and a coordinate value calculator 415 that may calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to an IR communication standard.

The coordinate value calculator 415 may correct a hand shake or an error from a signal corresponding to the operation of the remote controller 200 received through the wireless communicator 151 and may calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

In another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

In another example, unlike the drawing, the coordinate value calculator 415 may be provided in the controller 170, not in the user input interface 150.

FIG. 5 is an internal block diagram of a display of FIG. 2.

Referring to the drawing, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the controller 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal va1, the timing controller 232 may output the data driving signal Sda and the gate driving signal Sga based on the converted image signal va1.

The timing controller 232 may further receive a control signal, a vertical synchronization signal Vsync, and the like, in addition to the image signal Vd from the controller 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to burn in.

The processor 270 may determine the subpixel having the largest accumulated current as the subpixel expected to burn in based on the current detected by the current detector 1110.

Meanwhile, based on a current detected by the current detector 1110, the processor 270 may calculate a burn-in subpixel or a burn-in expected subpixel of the OLED panel 210, and may control a current, lower than an allocated current, to flow through subpixels adjacent to the calculated burn-in subpixel or burn-in expected subpixel. Accordingly, burn-in of sub-pixels adjacent to the burn-in subpixel may be extended. As a result, it is possible to extend the entire service life of the image display apparatus 100 having the OLED panel 210.

Meanwhile, the processor 270 may control a current, higher than the allocated current, to flow through the calculated burn-in subpixel, such that a low current may flow through the subpixels adjacent to the calculated burn-in subpixel. Accordingly, a phenomenon of decreasing luminance may be prevented.

Meanwhile, if no burn-in occurs in the OLED panel 210, the processor 270 may control a current, lower than the allocated current, to flow through subpixels adjacent to the burn-in expected subpixel which is expected to burn in. Accordingly, burn-in of sub-pixels adjacent to the burn-in expected subpixel may be extended. As a result, it is possible to extend the entire service life of the image display apparatus 100 having the OLED panel 210.

Meanwhile, the processor 270 may control a data voltage, lower than an allocated data voltage, to be applied to subpixels adjacent to the calculated burn-in subpixel or burn-in expected subpixel.

Meanwhile, if no burn-in occurs in the OLED panel 210, the processor 270 may control a current, lower than the allocated current, to also flow through the burn-in expected subpixel which is expected to burn in. Accordingly, burn-in of the burn-in expected subpixel may be extended. As a result, it is possible to extend the entire service life of the image display apparatus 100 having the OLED panel 210.

Meanwhile, the processor 270 may control a current having a second level, higher than a first level, to flow through a second subpixel located at a position further than a first subpixel among subpixels adjacent to the calculated burn-in subpixel or burn-in expected subpixel, such that by controlling a higher current to flow through the second subpixel which is expected to have a longer service life, it is possible to prevent a phenomenon of decreasing luminance.

Meanwhile, the processor 270 may calculate a subpixel, having the greatest accumulated current in the OLED panel 210, based on the current detected by the current detector 1110, and may control a current, lower than the allocated current, to flow through subpixels adjacent to the subpixel having the greatest accumulated current. Accordingly, the entire service life of the image display apparatus 100 having the OLED panel 210 may be extended.

Meanwhile, the processor 270 may control a lower current to flow through subpixels located closer to the subpixel having the greatest accumulated current. Accordingly, the entire service life of the image display apparatus 100 having the OLED panel 210 may be extended.

Figure 6A:
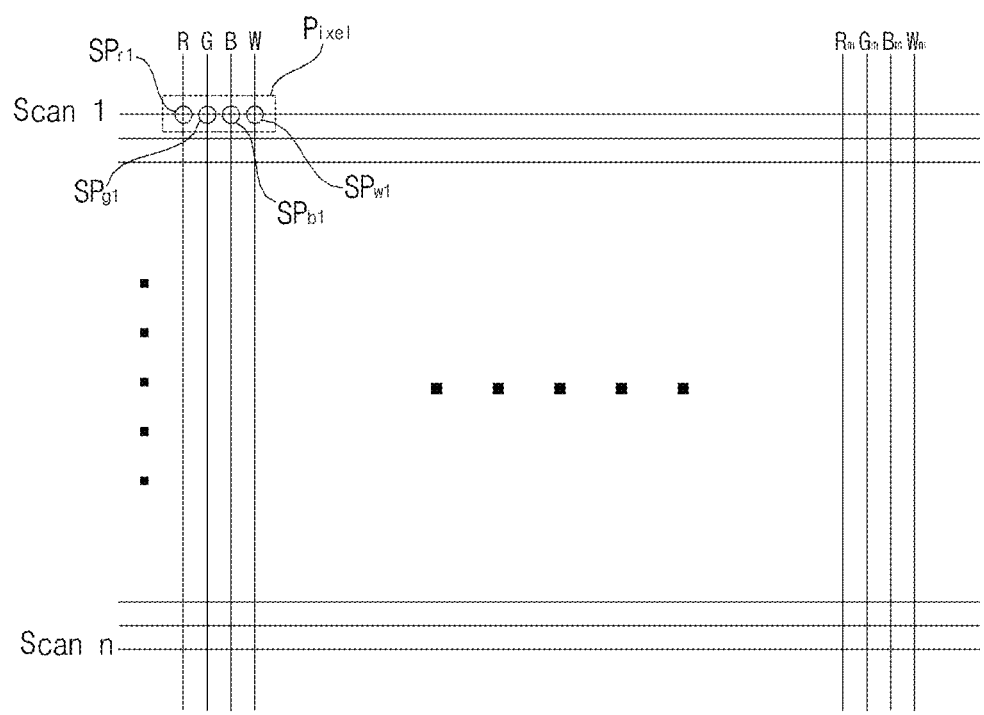
FIG. 6A and FIG. 6B are diagrams referred to in the description of an organic light emitting diode panel of FIG. 5.
Figure 6B:
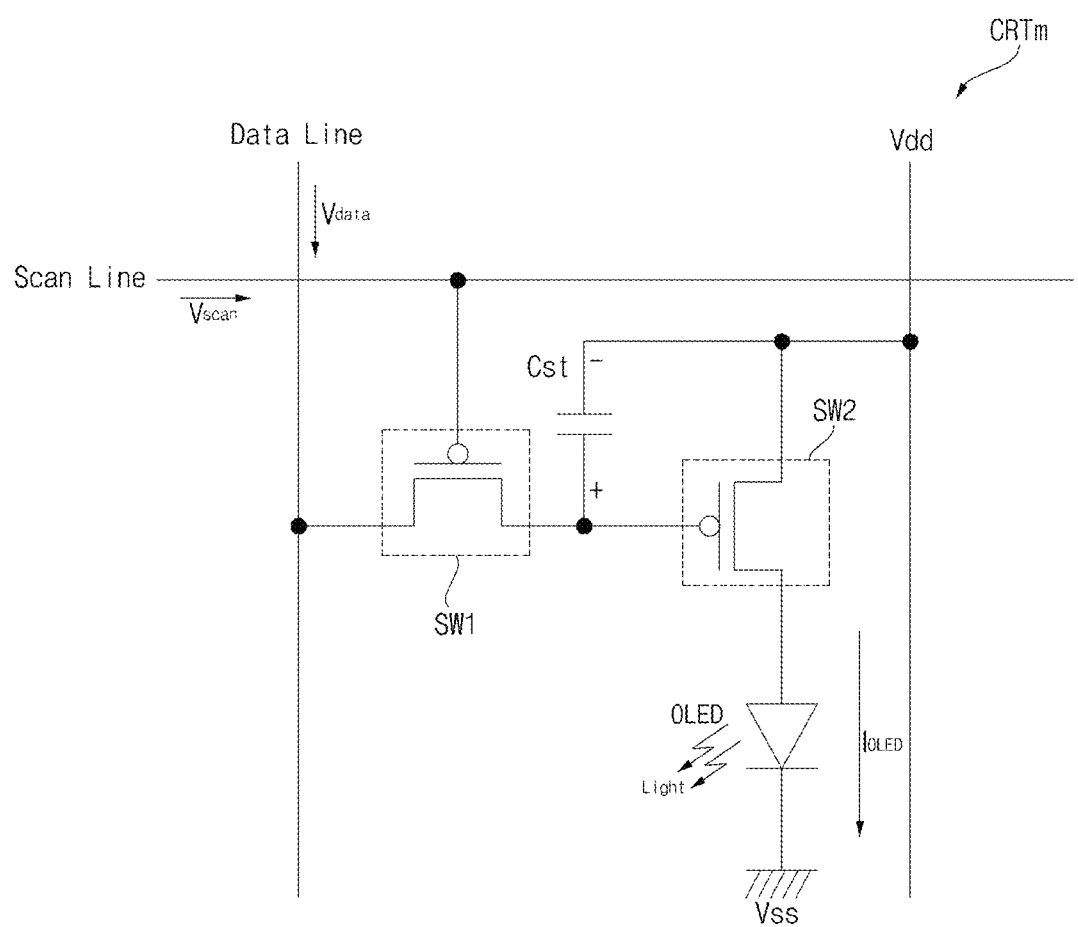

FIGS. 6A and 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan 1 to Scan n and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRT), as an active circuit, may include a scan switching element SW1, a storage capacitor Cst, a drive switching element SW2, and an organic light emitting layer OLED.

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the driving transistor SW2, and stores a predetermined difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst changes according to the level difference of the data signal Vdata.

In another example, when the data signal has a different pulse width according to a Pulse Width Modulation (PWM) method, the power level stored in the storage capacitor Cst changes according to the pulse width difference of the data signal Vdata.

The drive switching element SW2 is turned on according to the power level stored in the storage capacitor Cst. When the drive switching element SW2 is turned on, the driving current (IDLED), which is proportional to the stored power level, flows in the organic light emitting layer OLED. Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used as the switching transistor SW1 and the driving transistor SW2, but an n-type MOSFET or other switching element such as a JFET, IGBT, SIC, or the like are also available.

Meanwhile, the pixel is a hold-type element that continuously emits light in the organic light emitting layer OLED, after a scan signal is applied, during a unit display period, specifically, during a unit frame.

Meanwhile, subpixels emit light as a current flows to the organic light emitting layer OLED in the respective subpixels illustrated in FIG. 6B.

Figure 7:
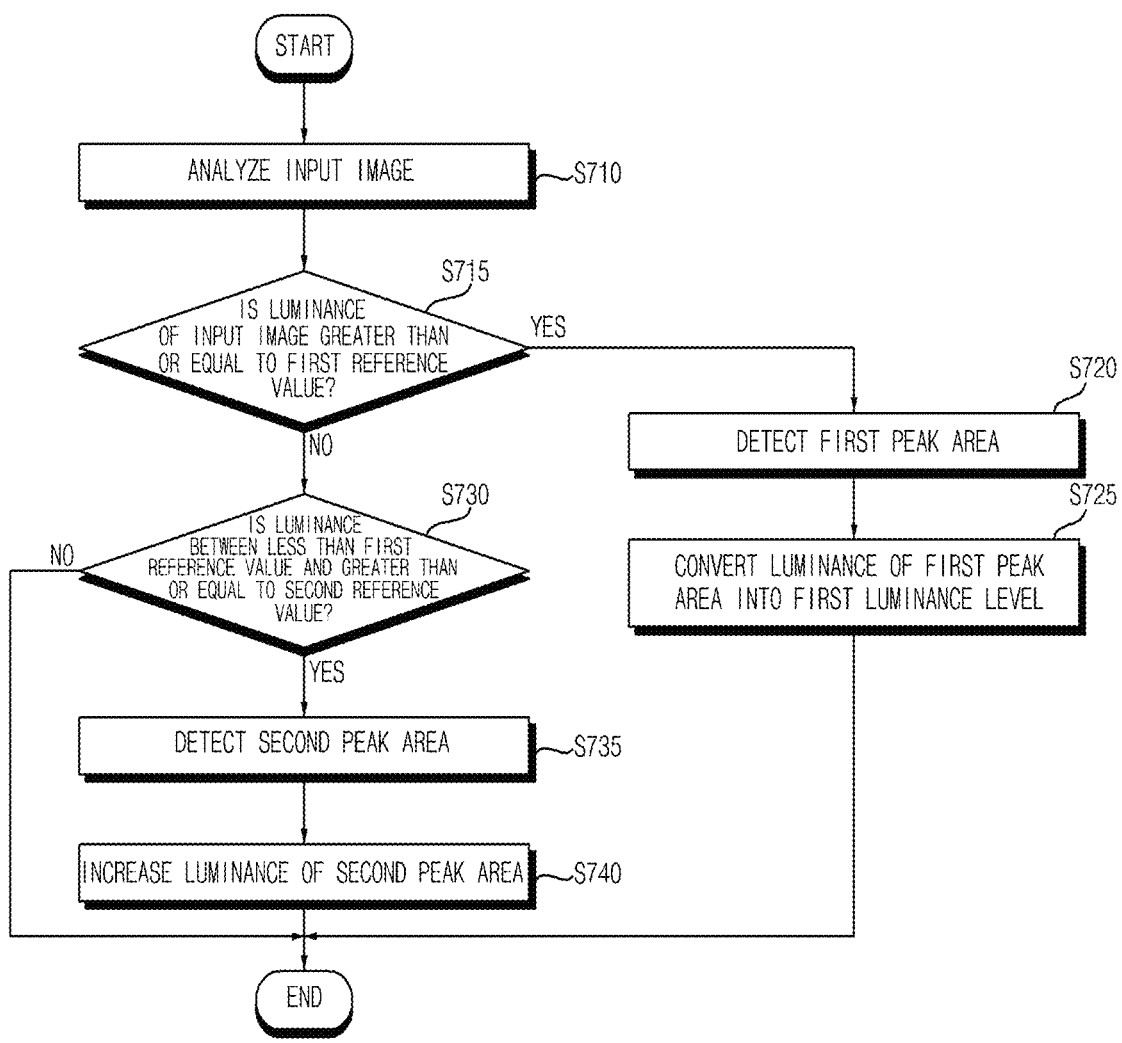
FIG. 7 is a flowchart illustrating an example of an operating method of an image display apparatus according to an embodiment of the present disclosure.

FIG. 7 is a flowchart illustrating an example of an operating method of an image display apparatus according to an embodiment of the present disclosure, and FIGS. 8A to 16C are diagrams referred to in the description of the operating method of FIG. 7.

First, referring to FIG. 7, the controller 170 may receive an input image.

The input image may be an external image received from an external source, or may be an image stored in the memory 140.

For example, the input image may be a broadcast image, an image received from an external device (USB, mobile terminal, etc.), or an image stored in the memory 140.

Then, the controller 170 may analyze the input image (S710).

The controller 170 may calculate an Average Picture Level (APL) in units of frames or scenes of the input image.

Meanwhile, the processor 170 may extract luminance and color for each pixel in units of frames or scenes of the input image.

Further, the controller 170 may determine whether luminance of the input image is greater than or equal to a first reference value (S715), and may detect a corresponding area as a first peak area (S720).

In addition, the controller 170 controls the detected first peak area to be converted into a first luminance level which is a constant level (S725).

Then, if luminance of an area of the input image is not greater than or equal to the first reference value in S715, the controller 170 determines whether the luminance of the area is between the first reference value and a second reference value less than the first reference value (S730), and may detect the corresponding area as a second peak area (S735).

Further, the controller 170 may increase luminance of the detected second peak area (S740).

Particularly, the controller 170 may control a luminance variation of the first peak area to be greater than a luminance variation of the second peak area.

Meanwhile, the controller 170 may perform luminance conversion on the input image, and may control the image, on which the luminance conversion is performed, to be displayed on the display 180. In this manner, as a luminance level of the second peak area increases, luminance representation as well as contrast may be improved. Accordingly, a wide high-dynamic range may be achieved.

Meanwhile, if the number of pixels in the second peak area is less than a predetermined number, the controller 170 performs first tone mapping based on the first peak area, and if the number of pixels in the second peak area exceeds a predetermined number, the controller 170 performs second tone mapping based on the first peak area and the second peak area, in which during the second tone mapping, a luminance value of the second peak area is preferably greater than a luminance value of the second peak area. Accordingly, luminance and contrast during displaying image may be improved.

For example, if the number of pixels in the second peak area is less than 20, the controller 170 may perform the first tone mapping based on the first peak area while ignoring the second peak area. In this case, the first tone mapping may correspond to a curve CVa of FIG. 8B.

Meanwhile, if the number of pixels in the second peak area exceeds 20, the controller 170 may perform the second tone mapping based on the first peak area and the second peak area. In this case, the second tone mapping may correspond to a curve CVb of FIG. 8B.

Figure 8A:
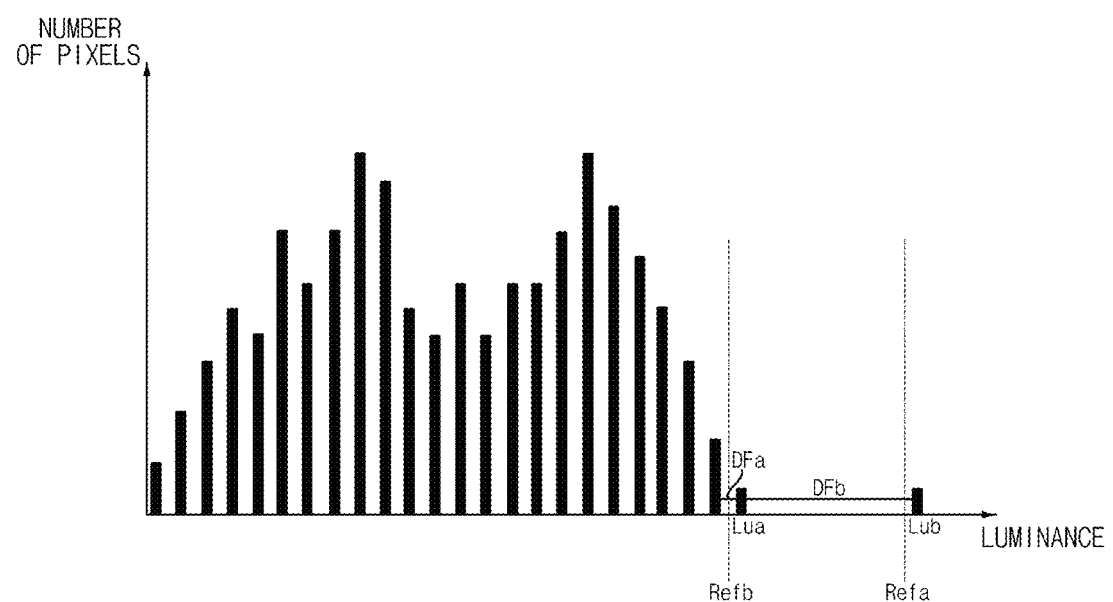
FIGS. 8A to 16C are diagrams referred to in the description of the operating method of FIG. 7.
Figure 8B:
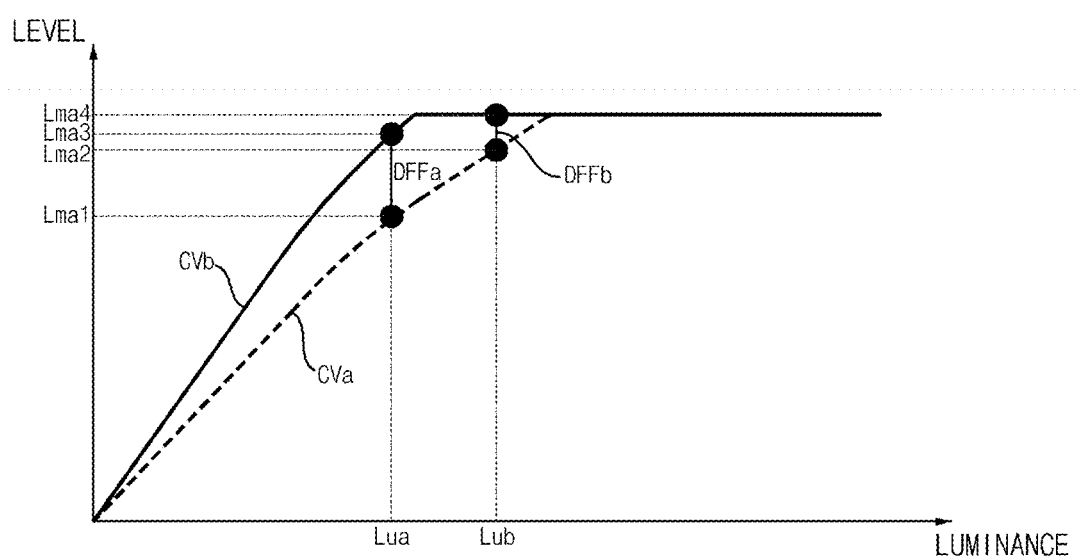

In comparison of the curve CVa and the curve CVb of FIG. 8B, in the curve CVa corresponding to the first tone mapping, luminance Lua of the second peak area is converted into Lma1, and luminance Lub of the first peak area is converted into Lma2; and in the curve CVb corresponding to the second tone mapping, luminance Lua of the second peak area is converted into Lma3 which is greater than Lma1 by DFFa, and luminance Lub of the first peak area is converted into Lma4 which is greater than Lma2 by DFFb.

That is, the converted luminance levels of the first peak area and the second peak area in the curve CVb corresponding to the second tone mapping are greater than those in the curve CVa corresponding to the first tone mapping.

Particularly, a luminance increment DFFa of the second peak area is greater than a luminance increment DFFb of the first peak area in the curve CVb corresponding to the second tone mapping, when compared to the curve CVa corresponding to the first tone mapping.

Accordingly, luminance representation in the second peak area during the second tone mapping may be considerably improved. Accordingly, luminance and contrast of the second peak area during displaying image may be improved.

Meanwhile, the controller 170 may control the first reference value to change based on a peak luminance of the input image. Accordingly, luminance and contrast during displaying image may adaptively be improved.

Meanwhile, it is preferable that a difference between the second reference value and the first reference value is within a predetermined range. Accordingly, the first peak area and the second peak area may be easily detected.

Meanwhile, the first reference value preferably corresponds to a peak luminance of the input image, such that an area, corresponding to the peak luminance of the input image, may be detected as the first peak area.

FIG. 8A is a diagram illustrating an example of converting luminance of an input image into a histogram.

Referring to the drawing, luminance distribution of the input image may be obtained as illustrated in the drawing.

The controller 170 may set an area, corresponding to luminance Lub greater than or equal to the first reference value Refa, as the first peak area.

Further, the controller 170 may set an area, corresponding to luminance Lua less than the first reference value Refa and greater than or equal the second reference value refb, as the second peak area.

Meanwhile, referring to the drawing, a difference between luminance Lub and an adjacent luminance value is DFb, and a difference between luminance Lua and an adjacent luminance value is DFa, which is less than DFb.

Meanwhile, the controller 170 may perform luminance conversion on the input image in order to achieve high dynamic range, as illustrated in FIG. 8B. FIG. 8B is a diagram illustrating an example of luminance conversion based on the first curve Cva and luminance conversion based on the second curve Cvb.

First, during luminance conversion based on the first curve Cva, the first peak area corresponding to the luminance Lub may be converted into Lm2, and the second peak area corresponding to luminance Lua may be converted into Lm1, which is lower than Lm2.

Then, during luminance conversion based on the second curve Cvb, the first peak area corresponding to the luminance Lub may be converted into Lm4, which is a constant level, and the second peak area corresponding to luminance Lua may be converted into Lm3, which is lower than Lm3.

That is, during luminance conversion in the second curve Cvb, the first peak area is constantly converted into Lm4 which is a saturation level, but the second peak area is converted into Lm3, such that a luminance variation of the second peak area is greater than a luminance variation of the first peak area. Accordingly, luminance representation of the second peak area may be considerably enhanced.

Meanwhile, in comparison of the first curve Cva and the second curve Cvb, during luminance conversion of the luminance Lub, a luminance variation in the second curve Cvb compared to the first curve Cva increases to DFFb, and during luminance conversion of the luminance Lua, a luminance variation in the second curve Cvb compared to the first curve Cva increases to DFFa. Particularly, the variation DFFa is greater than DFFb.

Accordingly, during luminance conversion in the second curve Cvb, compared to the first curve Cva, luminance representation of the first peak area and the second peak area may be improved, and particularly a luminance variation of the second peak area is greater than a luminance variation of the first peak area, such that luminance representation of the second peak area may be improved.

Figure 8C:
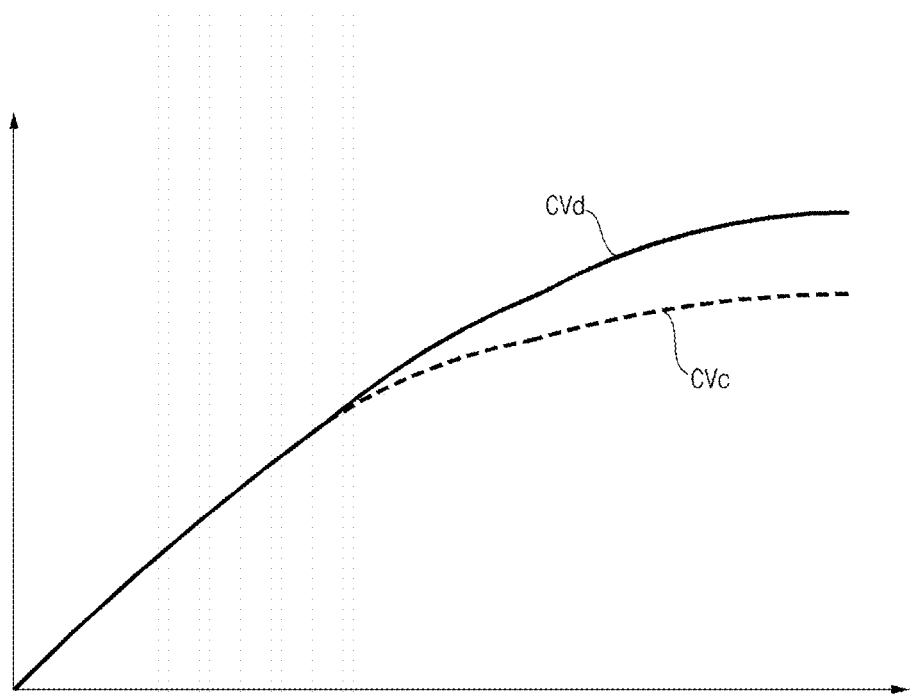

Meanwhile, FIG. 8C is a diagram illustrating a change in contrast based on the first curve Cvc and a change in contrast based on the second curve Cvd. In FIG. 8C, a horizontal axis indicates the luminance level, and a vertical axis indicates the contrast level.

Referring to the drawing, in the second curve Cvd compared to the first curve Cvc, contrast is improved in a high-luminance region. Particularly, contrast may be improved in the first peak area corresponding to the luminance Lub and the second peak area corresponding to the luminance Lua, as illustrated in FIG. 8B and the like.

Figure 9A:
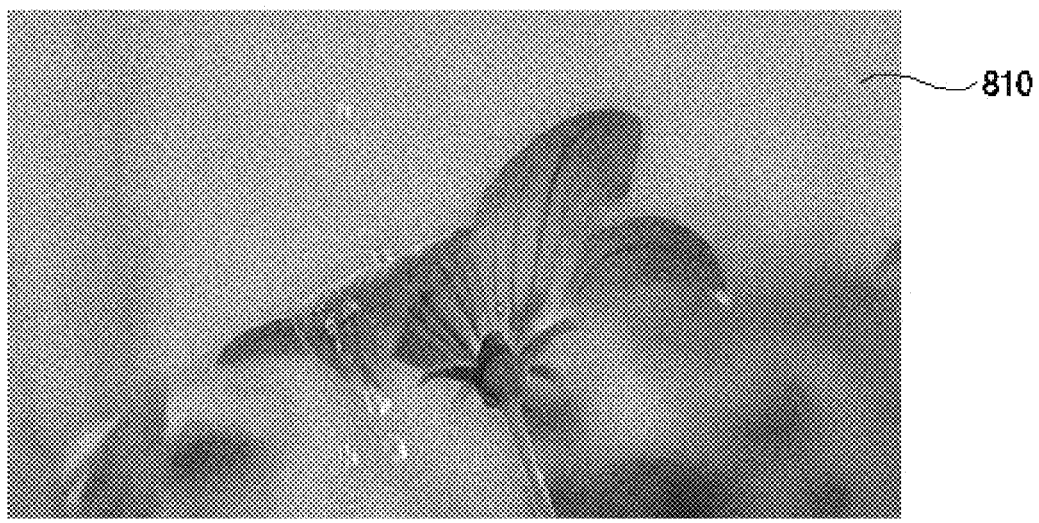
Figure 9B:
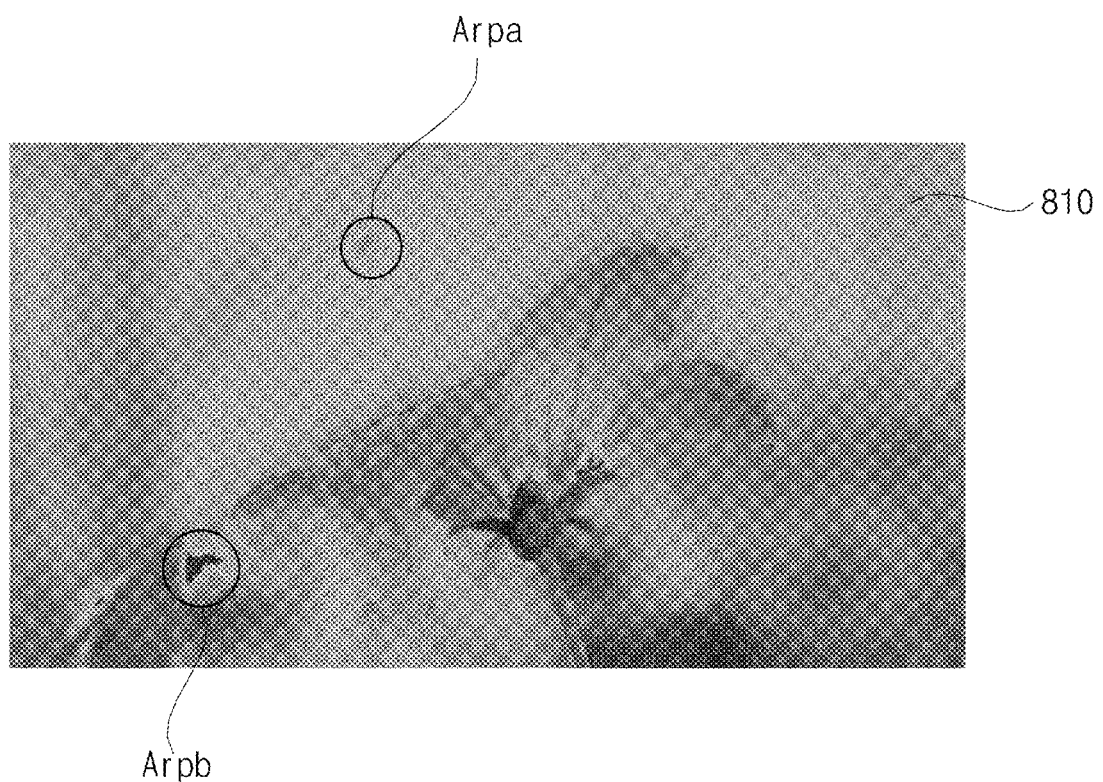

FIG. 9A is a diagram illustrating an example of an input image 810, and FIG. 9B is a diagram illustrating an example of detecting a first peak area Arpa and a second peak area Arpb in the input image 810.

Meanwhile, if a difference in peak luminance in the input image is less than a third reference value, the controller 170 may detect a corresponding area as the second peak area Arpb.

For example, the controller 170 may calculate a peak in predetermined units of the input image, and if a level difference with an adjacent peak is within the third reference value based on a histogram for each calculated peak, the controller 170 may detect a corresponding area as the second peak area Arpb.

That is, the controller 170 may detect an area corresponding to a peak in which a level difference between the peak and an adjacent peak is within the third reference value, as the second peak area Arpb. Accordingly, the second peak area Arpb may be easily detected.

Figure 9C:

Meanwhile, FIG. 9C is a diagram illustrating an image 820, on which luminance conversion is performed, based on the first curve Cva of FIG. 8B.

Figure 9D:

Next, FIG. 9D is a diagram illustrating an image 830, on which luminance conversion is performed, based on the second curve Cvb of FIG. 8B.

During luminance conversion, the controller 170 may convert luminance of the first peak area Arpa into a first luminance level, may increase luminance of the second peak area Arpb, and may control the image 830, on which the luminance conversion is performed, to be displayed on the display 180 as illustrated in FIG. 9D. Accordingly, luminance and contrast may be improved during displaying image.

Particularly, luminance and contrast representation of the second peak area Arpb in the image 830 of FIG. 9D may be improved compared to the image 820 of FIG. 9C.

Figure 10A:
Figure 10B:
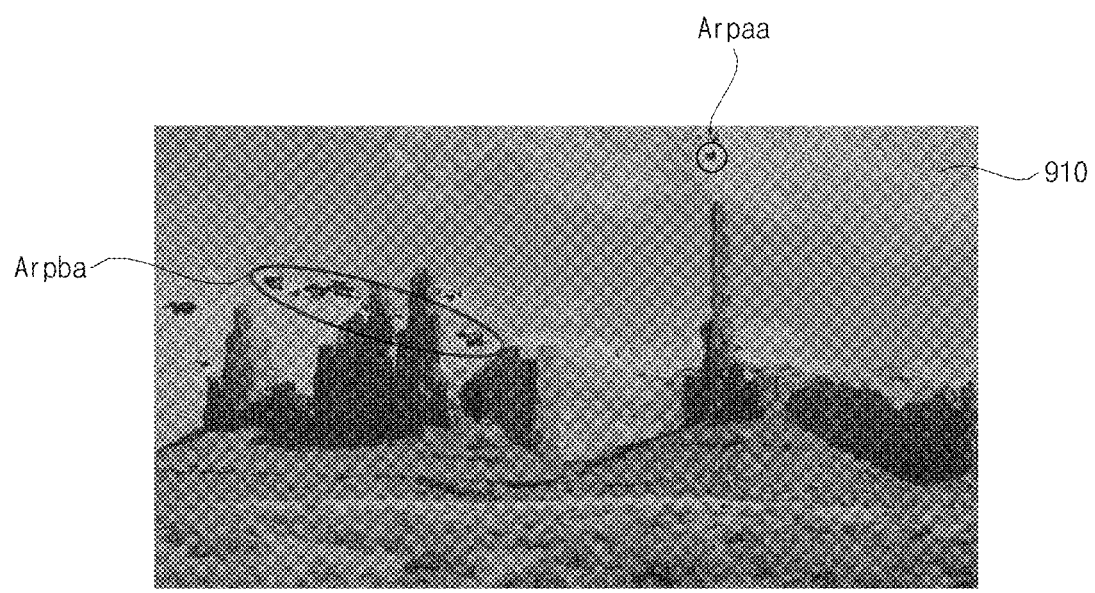

FIG. 10A is a diagram illustrating another example of an input image 910, and FIG. 10B is a diagram illustrating an example of detecting the first peak area Arpaa and the second peak area Arpba in an input image 910 of FIG. 10B.

Figure 10C:

Next, FIG. 10C is a diagram illustrating an image 920, on which luminance conversion is performed, based on the second curve Cvb of FIG. 8B.

During luminance conversion, the controller 170 may convert luminance of the first peak area Arpaa into a first luminance level, may increase luminance of the second peak area Arpba, and may control the image 920, on which the luminance conversion is performed, to be displayed on the display 180 as illustrated in FIG. 10D. Accordingly, luminance and contrast may be improved during displaying image. Particularly, luminance and contrast representation of the second peak area Arpba in the image 920 of FIG. 10C may be improved.

Figure 11A:
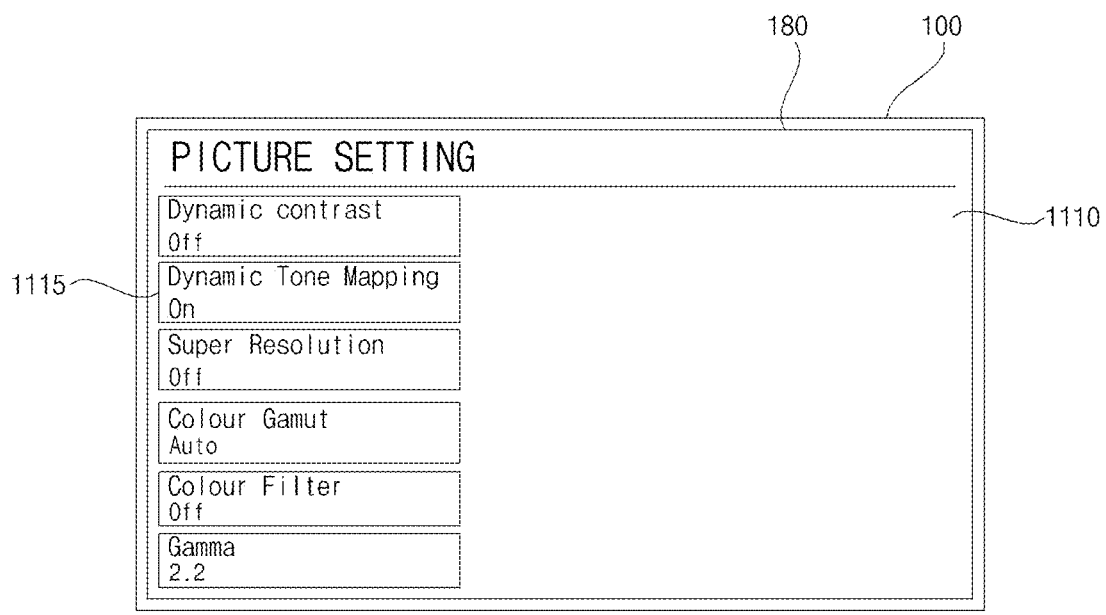

FIG. 11A is a diagram illustrating an image quality setting screen.

Referring to the drawing, when selecting menu items of the remote controller 200, the controller 170 may control displaying of a menu screen, and when selecting an image quality setting item from the menu screen, the controller 170 may control an image quality setting screen 1110 to be displayed on the display 180 as illustrated herein.

The image quality setting screen 1110 may include a dynamic contrast item for a contrast setting, a dynamic tone mapping item 1115 for a luminance setting, a super resolution item for a resolution setting, a color gamut item for a color gamut setting, a color filter item for a color setting, a gamma item for a gamma setting, and the like.

Figure 11B:
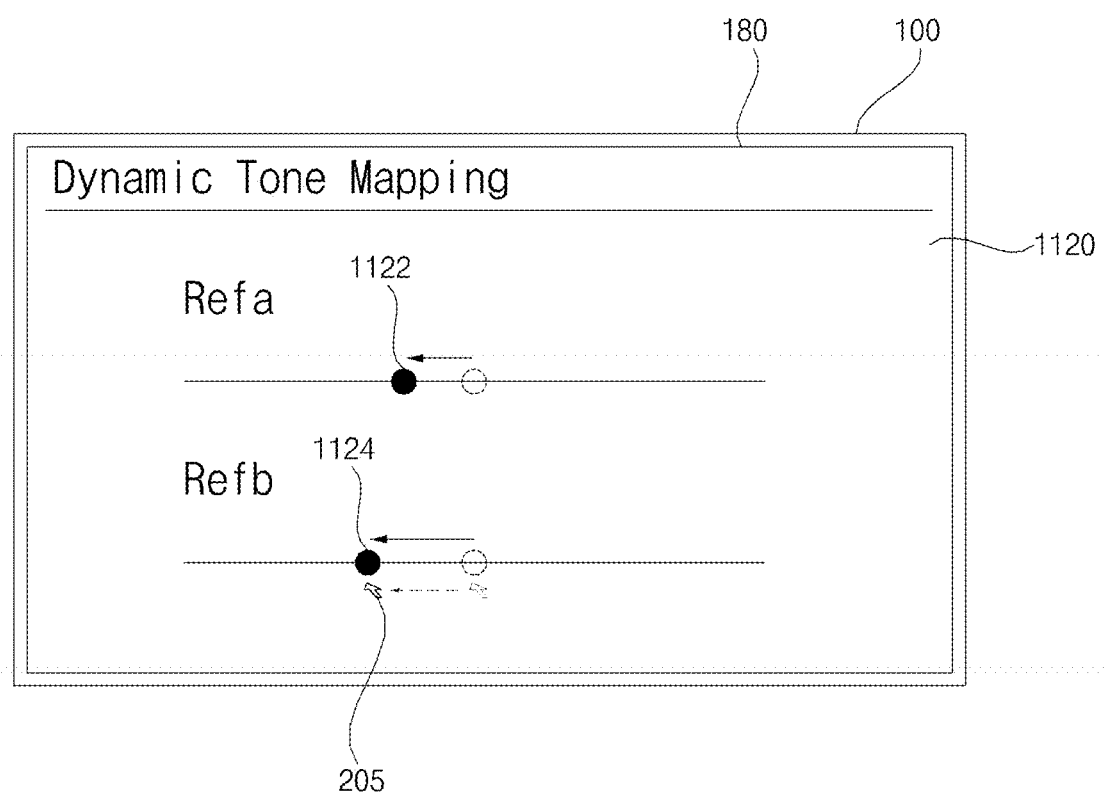

If the dynamic tone mapping item 1115 is selected based on a button input of the remote controller 200 or based on a selection input by a pointer 205 displayed corresponding to movement of the remote controller 200, the controller 170 may control displaying of a dynamic tone mapping screen 1120 for a luminance setting as illustrated in FIG. 11B.

Meanwhile, the dynamic tone mapping screen 1120 may include a first reference value item 1122 for setting a level of the first reference value Rrfa, and a second reference value item 1124 for setting a level of the second reference value Refb.

Based on a button input of the remote controller 200 or based on the pointer 205 displayed corresponding to movement of the remote controller 200, the controller 170 may select the first reference value item 1122 and may change the level of the first reference value. Accordingly, luminance and contrast may be set according to a user's preference.

FIG. 11B is a diagram illustrating an example in which the first reference value item 1122 is moved leftward according to a leftward movement of the pointer 205 displayed corresponding to movement of the remote controller 200. Accordingly, the controller 170 may lower the level of the first reference value Refa.

Figure 12A:
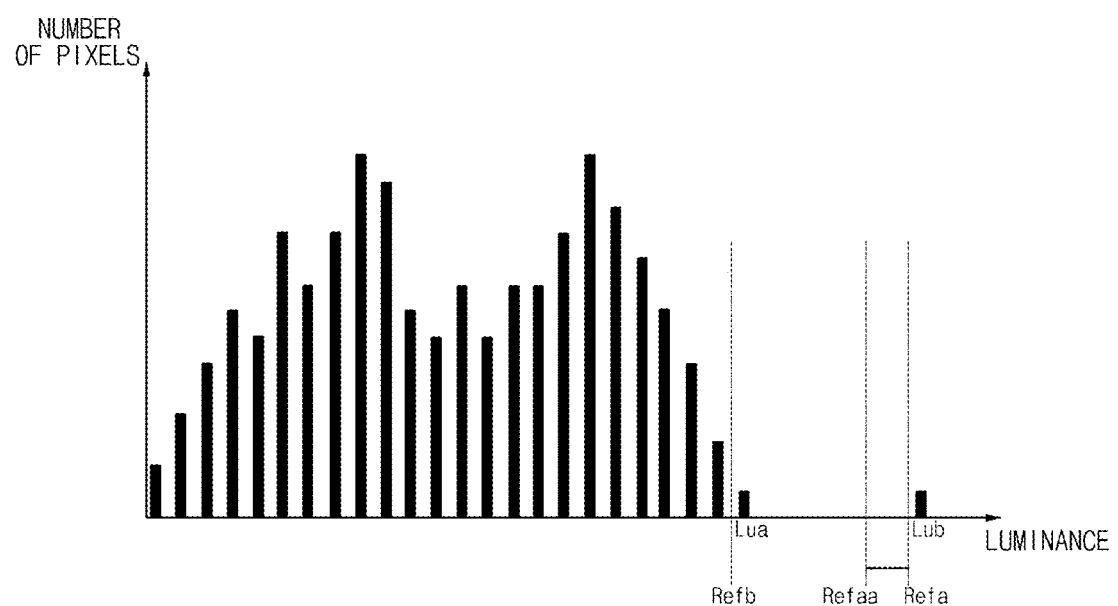

FIG. 12A is a diagram illustrating the distribution of luminance of the input image, in which a level of the first reference value decreases from Refa to Refaa as the first reference value item 1122 of FIG. 11B is moved leftward.

Meanwhile, as the level of the first reference value Refa decreases, the controller 170 may increase a size of the aforementioned first peak area, and may convert the first peak area corresponding to an increased size, into the first luminance level Lma4. Accordingly, an area saturated during luminance conversion may be increased.

Meanwhile, based on a button input of the remote controller 200 or based on the pointer 205 displayed corresponding to movement of the remote controller 200, the controller 170 may select a second reference value item 1124, and may change the level of the second reference value Refb. Accordingly, luminance and contrast may be set according to a user's preference.

FIG. 11B is a diagram illustrating an example in which the second reference value item 1124 is moved leftward according to a leftward movement of the pointer 205 displayed corresponding to movement of the remote controller 200. Accordingly, the controller 170 may lower the level of the second reference value Reba.

Figure 12B:
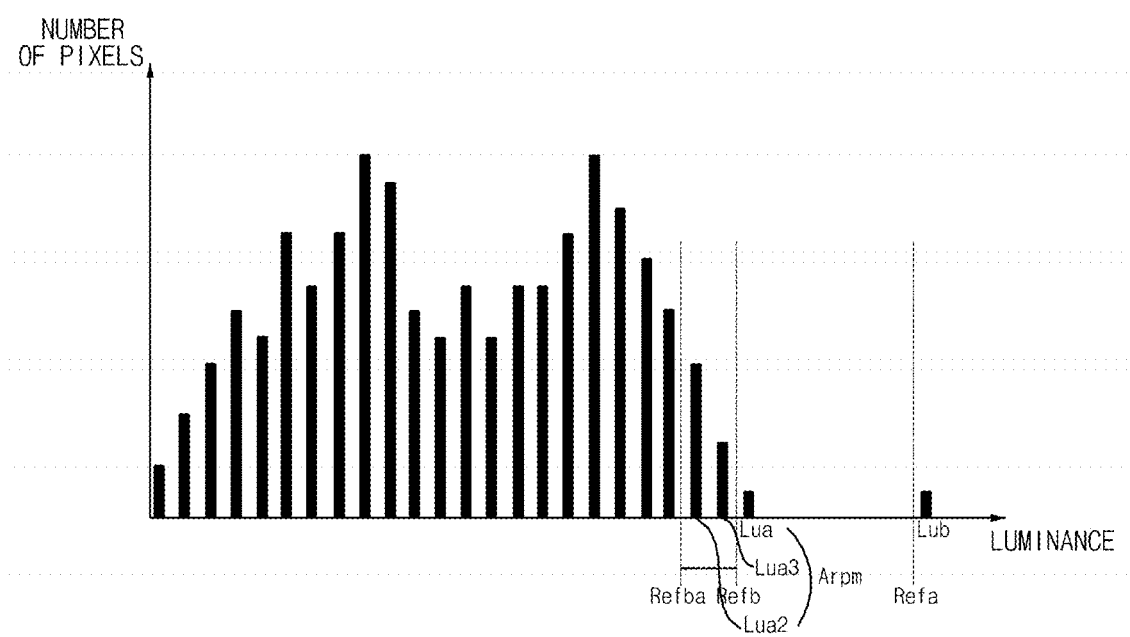

FIG. 12B is a diagram illustrating the distribution of luminance of the input image, in which a level of the second reference value decreases from Refb to Refba as the second reference value item 1124 of FIG. 11B is moved leftward.

Accordingly, in addition to the luminance level Lua, luminance levels Lua2 and Lua3 are further included as luminance levels corresponding to the second peak area.

As the level of the second reference value decreases, the controller 170 may increase a size of the aforementioned second peak area, and may increase luminance of the second peak area having an increased size. Accordingly, luminance and contrast of a corresponding gradation area may be improved.

Meanwhile, the controller 170 may calculate an Average Picture Level (APL) in units of frames or scenes, and may control a luminance increment of the second peak image to be changed according to the APL. Accordingly, luminance and contrast according to the APL during displaying image may be improved.

Meanwhile, as the APL increases, the controller 170 may decrease a luminance increment of the second peak image. Accordingly, during displaying image, luminance and contrast may be improved in consideration of power consumption, which will be described with reference to FIGS. 13A and 13B.

Figure 13A:
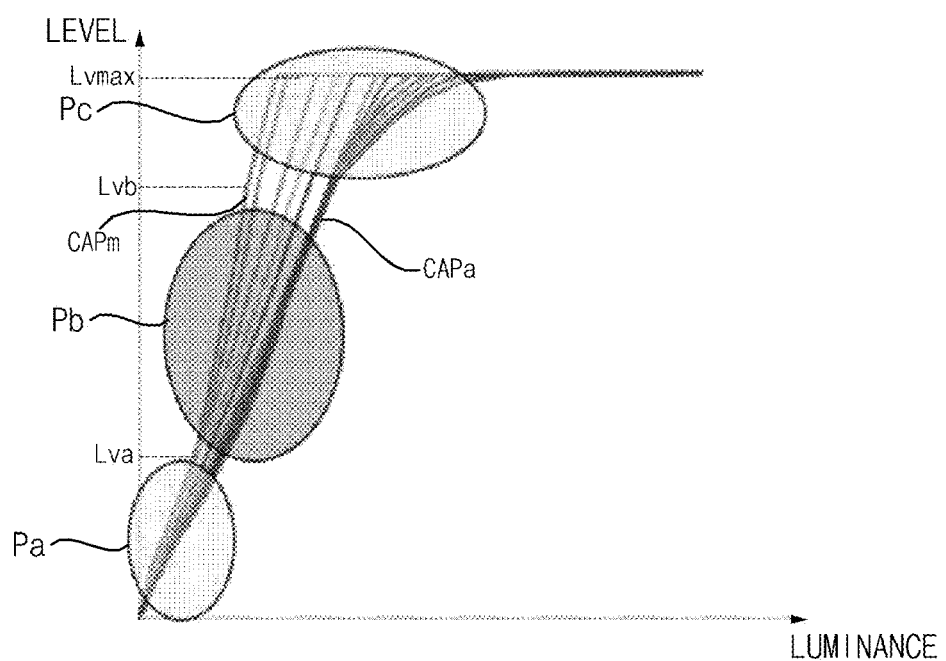

First, FIG. 13A illustrates an example of performing luminance conversion based on a plurality of curves when luminance conversion is performed on an input image.

The controller 170 may calculate an Average Picture Level (APL) in units of frames or scenes of an input image, and may control a luminance conversion curve to be changed according to the APL.

For example, in the case of a highest APL, the controller 170 controls luminance conversion to be performed based on a curve CAPa, and in the case of a lowest APL, the controller 170 may control luminance conversion to be performed based on a curve CAPm.

Referring to the drawing, as the APL increases, the controller 170 may decrease a luminance increment of a second peak image. Accordingly, during displaying image, luminance and contrast may be improved in consideration of power consumption.

Meanwhile, during luminance conversion, the controller 170 may divide the image into a low gradation region Pa having luminance lower than LVa, an intermediate gradation region Pb having luminance between LVa and LVb, and a high gradation region Pc having luminance exceeding LVb; and may control a luminance variation of the intermediate gradation region Pb to be less than that of the low gradation region Pa, and may control a luminance variation of the high gradation region Pc to be less than that of the intermediate gradation region Pb.

Particularly, the controller 170 may control luminance conversion to be performed by nonlinear scaling in the intermediate gradation region Pb. Accordingly, luminance representation in the intermediate gradation region Pb may be improved.

Figure 13B:
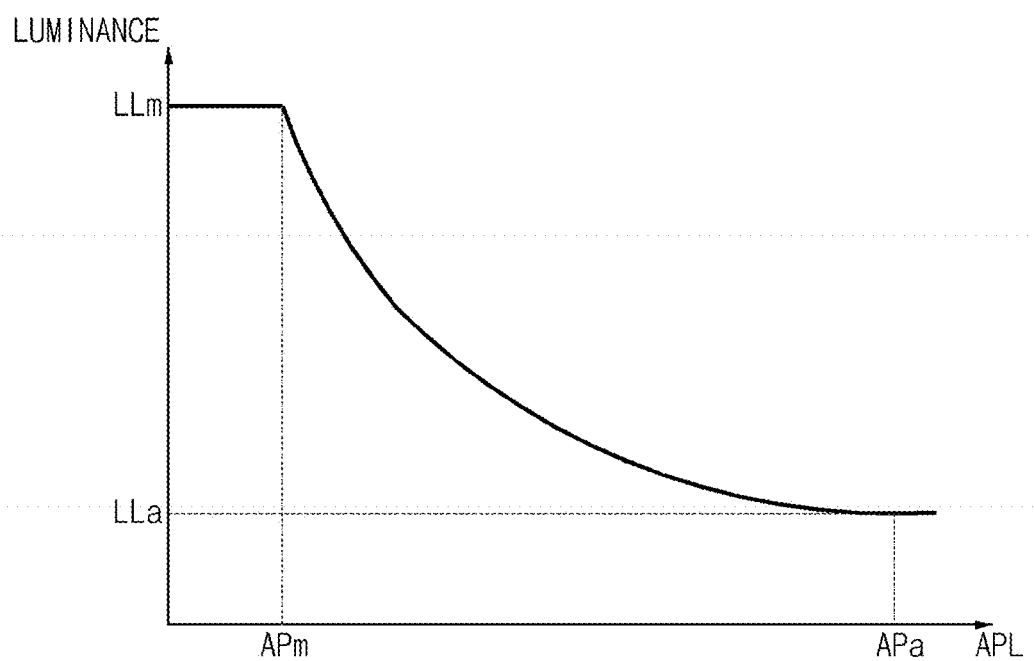

FIG. 13B is a diagram illustrating an APL versus luminance curve.

Referring to the drawing, in the case where an image is displayed on the OLED panel 210 included in the image display apparatus 100, which is a self-luminous element, APL driving may be performed to reduce power consumption and the like.

Here, the APL driving may indicate that controlling is performed such that as the APL increases, luminance decreases, and as the APL decreases, luminance increases, as illustrated herein.

In the drawing, an example is illustrated in which driving at APLa is performed at luminance LLa, and driving at Apm, which is less than APLa, is performed at luminance LLb.

Accordingly, as the APL increases, the controller 170 may decrease a luminance increment of the second peak image. Accordingly, during displaying image, luminance and contrast may be improved in consideration of power consumption.

Further, as the APL increases, the controller 170 may decrease a luminance increment of the first peak image. Accordingly, during displaying image, luminance and contrast may be improved in consideration of power consumption.

Figure 14A:
Figure 14B:

FIG. 14A is a diagram illustrating an input image 1110, and FIG. 14B is a diagram illustrating an image 1120, on which APL driving and luminance conversion in FIGS. 13A and 13B are performed such that brightness, luminance, and contrast of the image 1120 are improved.

Figure 15A:
Figure 15B:
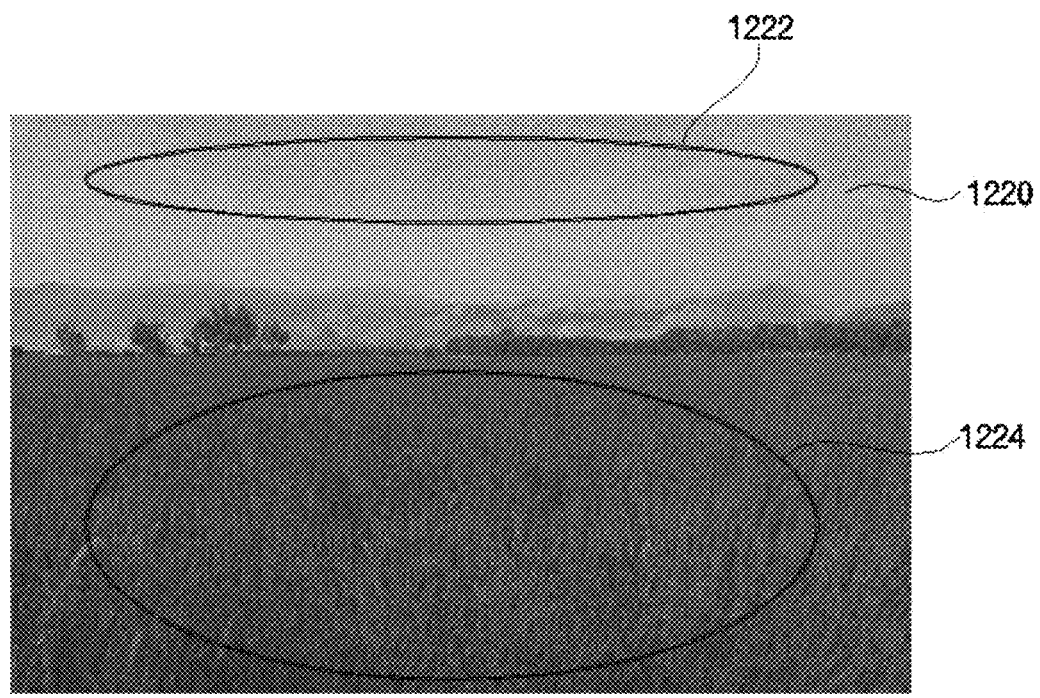

Next, FIG. 15A is a diagram illustrating an input image 1210, and FIG. 15B is a diagram illustrating an image 1220, on which APL driving and luminance conversion in FIGS. 13A and 13B are performed such that brightness, luminance, and contrast of the image 1210 are improved.

Particularly, brightness, luminance, and contrast of a first region 1222 in the image 1220 may be improved, and color and contrast of a second region 1224 in the image 1220 may be improved.

Meanwhile, while receiving an image, having a pattern which is gradually reduced in size, if a size of the pattern is greater than or equal to a reference size, the controller 170 may increase luminance of the pattern; and if a size of the pattern is less than the reference size, the controller 170 may control luminance of the pattern to be maintained at a predetermined level, or may control luminance of the pattern to remain as it is. Accordingly, by changing luminance conversion according to a pattern size relative to the entire image, optimal luminance and contrast representation of the input image may be provided, which will be described with reference to FIGS. 16A to 16C.

Figure 16A:
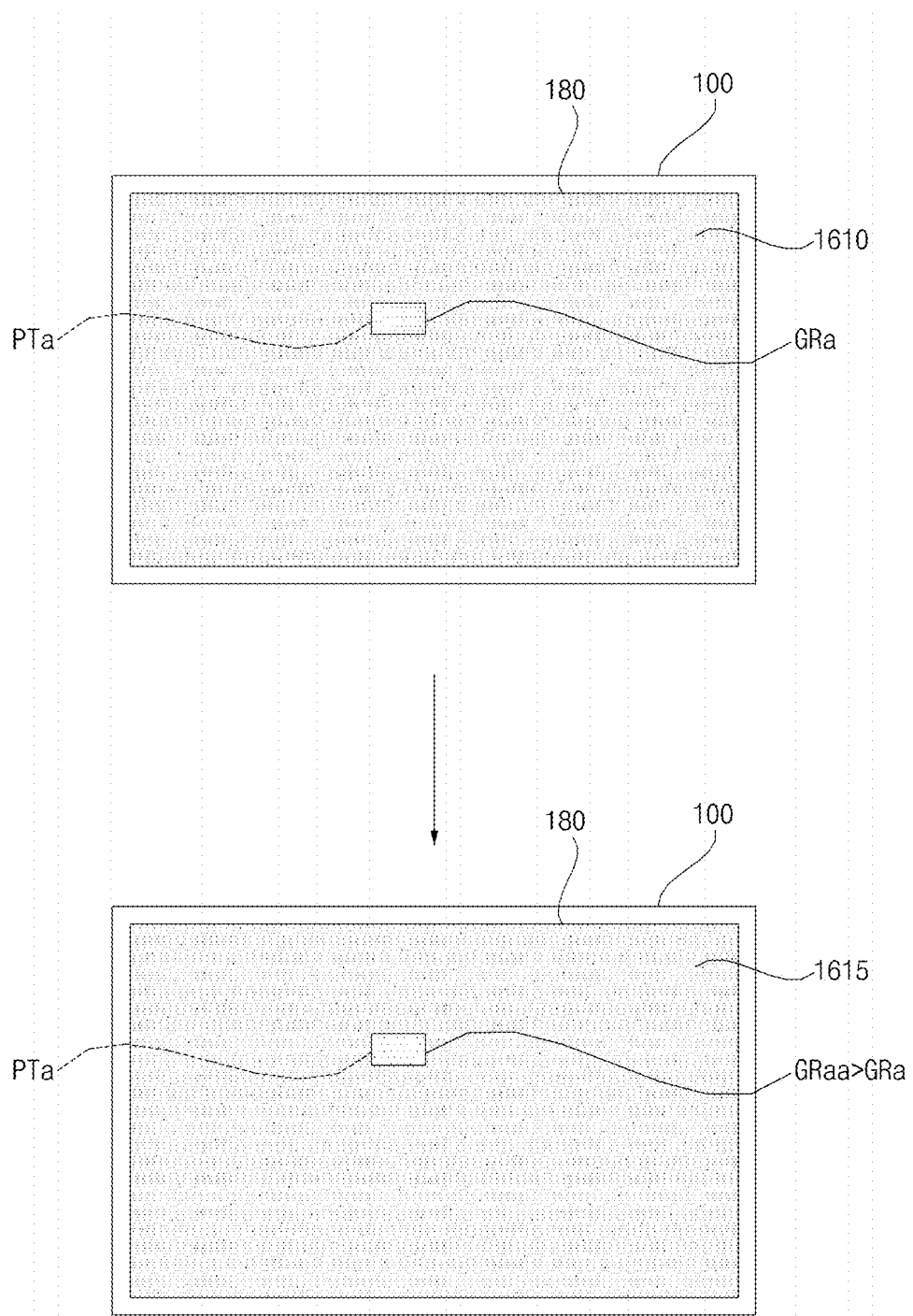

First, FIG. 16A illustrates an example in which a size of a pattern PTa in an input image 1610 is a first size.

If a size of the pattern PTa in the input image 1610 is the first size which is greater than or equal to a reference size, the controller 170 may increase luminance GRa to Graa by increasing luminance of the pattern.

In this case, the pattern PTa in the input image 1610 may correspond to the aforementioned second peak area, and thus the controller 170 may increase the luminance.

Figure 16B:
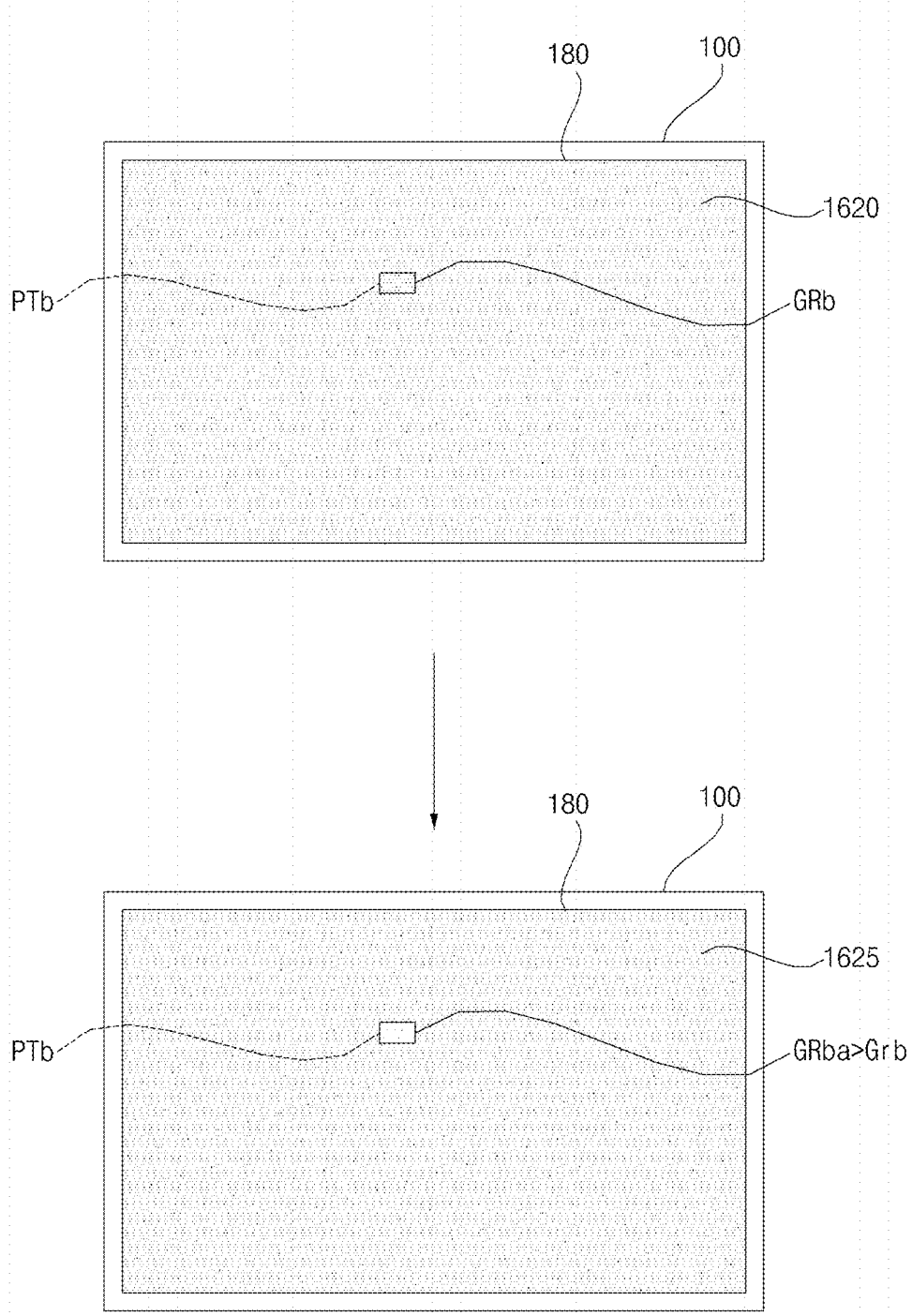

Next, FIG. 16B illustrates an example in which a size of a pattern PTb in an input image 1620 is a second size.

If a size of the pattern PTb in the input image 1620 is the second size which is less than the first size of FIG. 16A but greater than or equal to the reference size, the controller 170 may increase luminance GRb to Grba by increasing luminance of the pattern.

In this case, the pattern PTb in the input image 1620 may correspond to the aforementioned second peak area, and thus the controller 170 may increase the luminance. Particularly, a luminance increment may be greater than FIG. 16A.

Figure 16C:
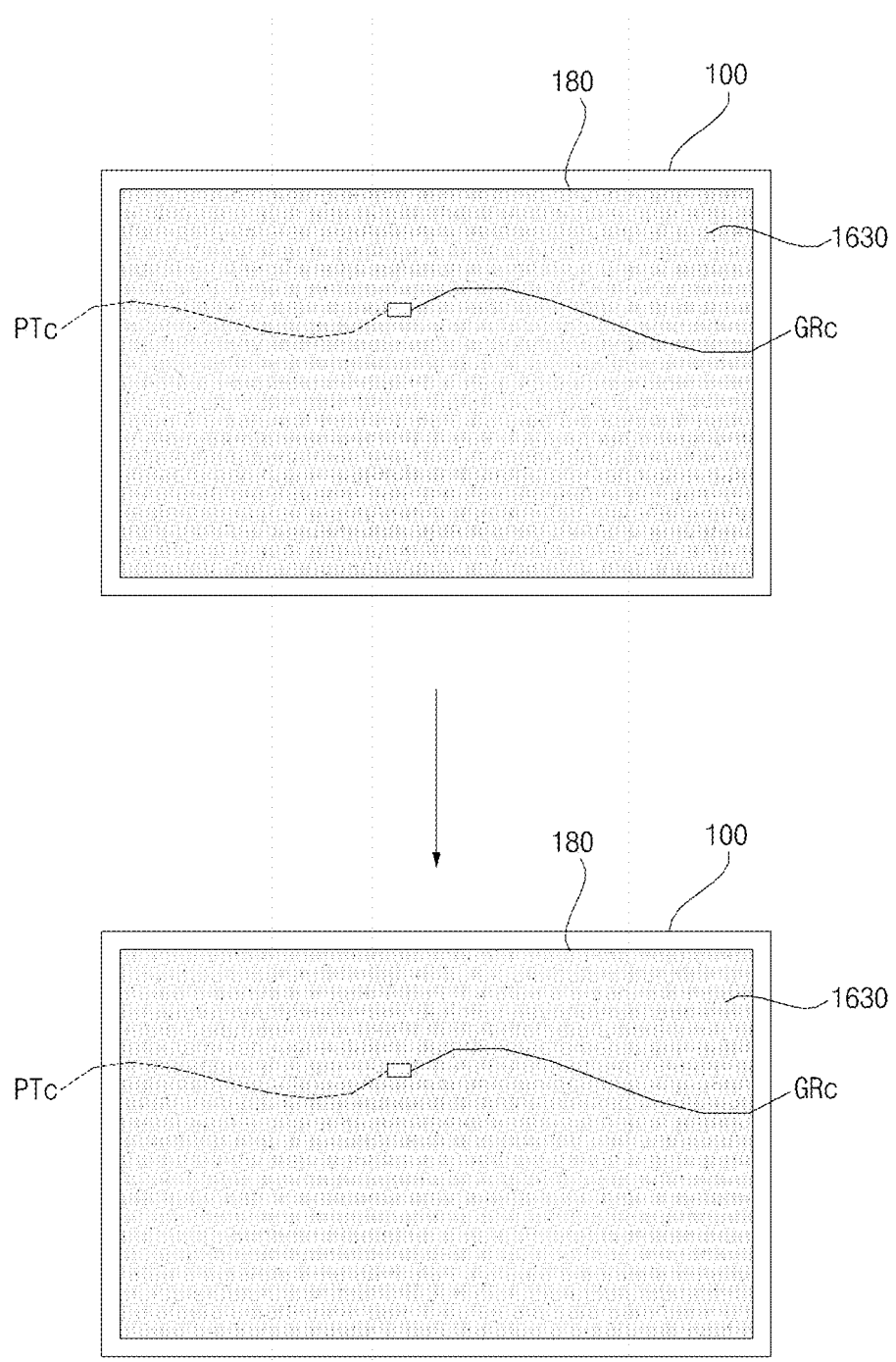

Next, FIG. 16C illustrates an example in which a size of a pattern PTb in an input image 1630 is a third size.

If a size of the pattern PTc in the input image 1630 is the third size, which is less than the second size of FIG. 16B and the reference size, the controller 170 may control luminance GRc to remain as Grc without changing luminance of the pattern.

In this case, the pattern PTc in the input image 1630 may correspond to the aforementioned first peak area, and thus the controller 170 may convert the luminance into a predetermined luminance level, or may control the luminance to remain as it is without changing the luminance of the input image.

Accordingly, by changing luminance conversion according to a pattern size relative to the entire image, optimal luminance and contrast representation of the input image may be provided.

An image display apparatus according to an embodiment of the present disclosure includes: a display; and a controller configured to control the display, wherein the controller detects a first peak area corresponding to a luminance value greater than or equal to a first reference value among luminance values of an input image, and a second peak area corresponding to a luminance value between the first reference value and a second reference value less than the first reference value among the luminance values of the input image, in response to the number of pixels in the second peak area being less than or equal to a predetermined number, the controller performs first tone mapping based on the first peak area; and in response to the number of pixels in the second peak area exceeding the predetermined number, the controller performs second tone mapping based on the first peak area and the second peak area, wherein a luminance value of the second peak area during the second tone mapping is greater than a luminance value of the second peak area during the first tone mapping. Accordingly, luminance and contrast during displaying image may be improved.

Particularly, compared to the first peak area in which luminance is saturated, luminance of the second peak area is increased such that luminance and contrast during displaying image may be improved.

Meanwhile, the controller may control a luminance variation of the second peak area to be greater than a luminance variation of the first peak area. Accordingly, luminance and contrast of the second peak area during displaying image may be improved.

Meanwhile, in response to a difference in peak luminance of the input image being less a third reference value, the controller may detect a corresponding area as the second peak area. Accordingly, the second peak area may easily be detected.

Meanwhile, the controller may calculate an Average Picture Level (APL) in units of frames or scenes, and may control a luminance increment of the second peak image to be changed according to the APL. Accordingly, luminance and contrast according to the APL during displaying image may be improved.

Meanwhile, as the APL increases, the controller may decrease a luminance increment of the second peak image. Accordingly, luminance and contrast during displaying image may be improved in consideration of power consumption.

Meanwhile, the controller may change a level of the second reference value based on a setting input. Accordingly, luminance and contrast may be set according to a user's preference.

Meanwhile, as the level of the second reference value decreases, the controller may increase a size of the second peak area, and may increase luminance of the second peak area having the increased size. Accordingly, luminance and contrast of a corresponding gradation area may be improved.

Meanwhile, the controller may change the level of the first reference value based on a setting input. Accordingly, luminance and contrast may be set according to a user's preference.

Meanwhile, as the level of the first reference value decreases, the controller may increase a size of the first peak area, and may control luminance of the first peak area corresponding to the increased size, to be converted into the first luminance level. Accordingly, an area which is saturated when luminance conversion is performed may be increased.

Meanwhile, when the size of the pattern is greater than or equal to the reference size in a state in which images having a gradually decreasing pattern are sequentially received, the controller may increase luminance of the pattern, and in response to the size of the pattern being less than the reference size, the controller may control luminance of the pattern to be maintained at a predetermined level or to remain as it is. Accordingly, by changing luminance conversion according to a pattern size relative to the entire image, optimal luminance and contrast representation of the input image may be provided.

Meanwhile, in response to an input of an image quality setting, the controller may control displaying of an image quality setting menu for setting an image quality, and in response to a dynamic tone mapping item being selected from the image quality setting menu, the controller may control displaying of the dynamic tone mapping screen for changing luminance, such that luminance conversion may be performed according to a user setting.

Meanwhile, the controller may receive a pointing signal from a remote controller, and may control displaying of a pointer corresponding to the pointing signal on the dynamic tone mapping screen. Accordingly, luminance conversion and the like may be allowed based on the pointer.

Meanwhile, the dynamic tone mapping screen may include a first reference value item for changing the first reference value, and a second reference value item for changing the second reference value, wherein based on movement of the pointer, the controller may change a setting of the first reference value item or the second reference value item. Accordingly, luminance conversion and the like may be performed based on the pointer.

Meanwhile, among the luminance values of the input image, the controller may control luminance of an area corresponding to a luminance value less than or equal to the second reference value to be changed by nonlinear scaling. Accordingly, luminance representation of the corresponding area may be increased.

Meanwhile, an image display apparatus according to another embodiment of the present disclosure to achieve the above object may include: a display; and a controller configured to control the display, wherein when a size of the pattern is greater than or equal to a reference size in a state in which an image having a gradually decreasing pattern are sequentially received, the controller may increase luminance of the pattern, and in response to the size of the pattern being less than the reference size, the controller may control luminance of the pattern to be maintained at a predetermined level or to remain as it is. Accordingly, luminance and contrast during displaying image may be improved. Particularly, by changing luminance conversion according to a pattern size relative to the entire image, optimal luminance and contrast representation of the input image may be provided.

Meanwhile, in response to a difference in peak luminance of the pattern being less than a reference value, and in response to the size of the pattern being greater than or equal to the reference size, the controller may increase luminance of the pattern. Accordingly, by changing luminance conversion according to a pattern size relative to the entire image, optimal luminance and contrast representation of the input image may be provided.

Meanwhile, in response to a difference in peak luminance of the pattern exceeding the reference value, and in response to the size of the pattern being less than the reference size, the controller may control luminance of the pattern to be maintained at a predetermined level or to remain as it is. Accordingly, by changing luminance conversion according to a pattern size relative to the entire image, optimal luminance and contrast representation of the input image may be provided.

Meanwhile, an operating method of the image display apparatus according to the present disclosure can be realized as a processor-readable code written on a recording medium readable by a processor included in the image display apparatus. The processor-readable recording medium may be any type of recording device in which data is stored in a processor-readable manner. Examples of the processor-readable recording medium include a ROM, a RAM, a CD-ROM, a magnetic tape, a floppy disc, an optical data storage, and a carrier wave, e.g., data transmission through the Internet. The processor-readable recording medium can be distributed over a plurality of computer systems connected to a network so that a processor-readable code is written thereto and executed therefrom in a decentralized manner.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the invention as defined by the appended claims, and the modified implementations should not be construed independently of the technical idea or prospect of the present disclosure.

What is claimed is:

1. An image display apparatus comprising:
a display; and
a controller configured to control the display,
wherein the controller is configured to:
detect a first peak area corresponding to a luminance value greater than or equal to a first reference value among luminance values of an input image, and a second peak area corresponding to a luminance value between the first reference value and a second reference value less than the first reference value among the luminance values of the input image;
in response to the number of pixels in the second peak area being less than or equal to a predetermined number, perform first tone mapping based on the first peak area; and in response to the number of pixels in the second peak area exceeding the predetermined number, perform second tone mapping based on the first peak area and the second peak area,
wherein a luminance value of the second peak area during the second tone mapping is greater than a luminance value of the second peak area during the first tone mapping.

2. The image display apparatus of claim 1, wherein the controller controls a luminance variation of the second peak area to be greater than a luminance variation of the first peak area.

3. The image display apparatus of claim 1, wherein in response to a difference in peak luminance of the input image being less a third reference value, the controller detects a corresponding area as the second peak area.

4. The image display apparatus of claim 1, wherein the controller calculates an Average Picture Level (APL) in units of frames or scenes, and changes a luminance increment of the second peak image based on the APL.

5. The image display apparatus of claim 4, wherein as the APL increases, the controller decreases a luminance increment of the second peak image.

6. The image display apparatus of claim 1, wherein based on a setting input, the controller changes a level of the second reference value.

7. The image display apparatus of claim 6, wherein as the level of the second reference value decreases, the controller increases a size of the second peak area, and increases luminance of the second peak area having the increased size.

8. The image display apparatus of claim 1, wherein based on a setting input, the controller changes the level of the first reference value.

9. The image display apparatus of claim 8, wherein as the level of the first reference value decreases, the controller increases a size of the first peak area, and converts luminance of the first peak area corresponding to the increased size into the first luminance level.

10. The image display apparatus of claim 1, wherein in case in which images having a gradually decreasing pattern are sequentially received, and the size of at least one pattern of the images is greater than or equal to a reference size, the controller increases luminance of the at least one pattern of the images that is greater than or equal to the reference size, and
wherein in response to the size of at least one pattern of the images being less than the reference size, the controller maintains luminance of the at least one pattern of the images that is less than the reference size at a predetermined level or as it is.

11. The image display apparatus of claim 1, wherein in response to an input of an image quality setting, the controller is configured to display an image quality setting menu for setting an image quality, and in response to a dynamic tone mapping item being selected from the image quality setting menu, the controller is configured to display the dynamic tone mapping screen for changing luminance.

12. The image display apparatus of claim 11, further comprising an interface for receiving a pointing signal from a remote controller,
wherein the controller is configured to display a pointer corresponding to the pointing signal on the dynamic tone mapping screen.

13. The image display apparatus of claim 12, wherein the dynamic tone mapping screen comprises a first reference value item for changing the first reference value, and a second reference value item for changing the second reference value, wherein based on movement of the pointer, the controller changes a setting of the first reference value item or the second reference value item.

14. The image display apparatus of claim 12, wherein among the luminance values of the input image, the controller changes luminance of an area corresponding to a luminance value less than or equal to the second reference value by nonlinear scaling.

15. The image display apparatus of claim 1, wherein during luminance conversion, the controller converts luminance of the first peak area into a first luminance level, increases luminance of the second peak area, and controls an image, on which the luminance conversion is performed, to be displayed on the display.

16. The image display apparatus of claim 1, wherein the controller changes the first reference value based on a peak luminance of the input image.

17. The image display apparatus of claim 1, wherein a difference between the second reference value and the first reference value is within a predetermined range.

18. An image display apparatus comprising:
a display; and
a controller configured to control the display,
wherein in case in which images having a gradually decreasing pattern are sequentially received, and a size of at least one pattern of the images is greater than or equal to a reference size, the controller increases luminance of the at least one pattern of the images that is greater than or equal to the reference size, and
wherein in response to the size of at least one pattern of the images being less than the reference size, the controller maintains luminance of the at least one pattern of the images that is less than the reference size at a predetermined level or as it is.

19. The image display apparatus of claim 18, wherein in response to a difference in peak luminance of the pattern being less than a reference value, and in response to the size of the pattern being greater than or equal to the reference size, the controller increases luminance of the pattern.

20. The image display apparatus of claim 18, wherein in response to a difference in peak luminance of the pattern exceeding the reference value, and in response to the size of the pattern being less than the reference size, the controller maintains luminance of the pattern at a predetermined level or as it is.

* * * * *